US010031861B2

(12) United States Patent
Chhabra et al.

(10) Patent No.: US 10,031,861 B2
(45) Date of Patent: Jul. 24, 2018

(54) PROTECT NON-MEMORY ENCRYPTION ENGINE (NON-MEE) METADATA IN TRUSTED EXECUTION ENVIRONMENT

(71) Applicant: Intel Corporation, Santa Clara, CA (US)

(72) Inventors: Siddhartha Chhabra, Portland, OR (US); Binata Bhattacharyya, Portland, OR (US); Raghunandan Makaram, Northborough, MA (US); Brian S. Morris, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 14/865,304

(22) Filed: Sep. 25, 2015

(65) Prior Publication Data

US 2017/0091119 A1    Mar. 30, 2017

(51) Int. Cl.
*G06F 12/14* (2006.01)
*G06F 12/0802* (2016.01)
(Continued)

(52) U.S. Cl.
CPC ...... *G06F 12/1408* (2013.01); *G06F 12/0802* (2013.01); *G06F 12/1466* (2013.01);
(Continued)

(58) Field of Classification Search
CPC ............. G06F 12/1408; G06F 12/0802; G06F 12/1466; G06F 12/2212; G06F 2212/1052;
(Continued)

(56) References Cited

U.S. PATENT DOCUMENTS

2004/0210320 A1\* 10/2004 Pandya ................... H04L 29/06
                                                                700/1
2008/0117679 A1    5/2008 Srinivasan et al.
(Continued)

FOREIGN PATENT DOCUMENTS

WO    2011078855 A1    6/2011

OTHER PUBLICATIONS

International Search Report and Written Opinion for International Patent Application No. PCT/US2016/048438, 13 pages, dated Apr. 5, 2017.

*Primary Examiner* — William B Jones
(74) *Attorney, Agent, or Firm* — Lowenstein Sandler LLP

(57) ABSTRACT

A server, processing device and/or processor includes a processing core and a memory controller, operatively coupled to the processing core, to access data in an off-chip memory. A memory encryption engine (MEE) may be operatively coupled to the memory controller and the off-chip memory. The MEE may store non-MEE metadata bits within a modified version line corresponding to ones of a plurality of data lines stored in a protected region of the off-chip memory, compute an embedded message authentication code (eMAC) using the modified version line, and detect an attempt to modify one of the non-MEE metadata bits by using the eMAC within a MEE tree walk to authenticate access to the plurality of data lines. The non-MEE metadata bits may store coherence bits that track changes to a cache line in a remote socket, poison bits that track error containment within the data lines, and possibly other metadata bits.

21 Claims, 16 Drawing Sheets

(51) Int. Cl.
*H04L 9/30* (2006.01)
*H04L 9/32* (2006.01)
*H04L 9/06* (2006.01)

(52) U.S. Cl.
CPC .............. *H04L 9/0637* (2013.01); *H04L 9/30* (2013.01); *H04L 9/3242* (2013.01); *G06F 2212/1052* (2013.01); *G06F 2212/402* (2013.01); *G06F 2212/60* (2013.01)

(58) Field of Classification Search
CPC . G06F 2212/402; G06F 2212/60; H04L 9/30; H04L 9/3242
USPC ........................................................ 713/193
See application file for complete search history.

(56) References Cited

U.S. PATENT DOCUMENTS

| | | |
|---|---|---|
| 2009/0172416 A1 | 7/2009 | Bosch et al. |
| 2011/0311051 A1* | 12/2011 | Resch .................... H04L 63/06 380/270 |
| 2012/0278635 A1 | 11/2012 | Hars et al. |
| 2013/0246812 A1* | 9/2013 | Resch ................. G06F 21/6218 713/193 |
| 2015/0089173 A1 | 3/2015 | Chhabra et al. |
| 2016/0283378 A1* | 9/2016 | Evangelinos ....... G06F 12/0815 |

\* cited by examiner

PROTECT NON-MEMORY ENCRYPTION ENGINE (NON-MEE) METADATA IN TRUSTED EXECUTION ENVIRONMENT

The present disclosure relates to the field of hardware security solutions and encryption, and, in particular, to the protection of non-memory encryption engine (non-MEE) metadata in a trusted execution environment.

BACKGROUND

Electronic data security has become an area of great focus for development as more daily transactions become computerized. Computing devices are constantly being utilized to exchange financial data, personal identification data, and the like. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device that is exchanged with a processor in the computing device may present a major vulnerability.

Device manufacturers, component manufacturers, and software developers, for example, continue to try to develop protective measures to combat vulnerabilities. Software-based malware detection and elimination solutions typically operate at the privilege level of an operating system (OS) in the computing device. These solutions may be effective against lower privilege attacks, but may not be able to combat higher-privileged malware like rootkits. Some hardware-based protective solutions are now emerging that are instituted very early during boot-up of a computing device, and thus may establish protective measures before malware even becomes active. Known-good protection firmware may be loaded early on during boot-up that may perform various functions such as checking whether subsequently loaded software comports with known-good versions, establishing protected areas of memory wherein data may be protected from being accessed by hostile software, and the like. While the benefits of these protective measures may be apparent, at least one issue that hardware protection systems may introduce is additional processing overhead at a very low level resulting in, for example, slower overall performance for the computing device.

DESCRIPTION OF EMBODIMENTS

Processing and memory devices are disclosed in which non-memory encryption engine (non-MEE) metadata bits are protected by being appended to a version (or counter) line that is used to generate an embedded message authentication code (eMAC). With some variation, these non-MEE metadata bits may be naturally protected using the eMAC within already developed methods of performing an MEE tree walk of counter level nodes for authentication of data accessed from off-chip memory. Protection of coherence bits helps protect against attackers that could redirect a remote socket access (needed to obtain updated data from cache in the remote socket) such that stale data is returned from a local socket rather than the updated data from the remote socket. Protection of poison bits helps protect against attackers that could flip a poison bit and thus mask errors, leading to ingestion of corrupt or modified data by a processor or memory device. Protection of other such non-MEE metadata bits will be similarly made possible by the present disclosure.

In one example, a server, processing device and/or processor includes a processing core and a memory controller, operatively coupled to the processing core, to access data in the off-chip memory. A memory encryption engine (MEE) may be operatively coupled to the memory controller and the off-chip memory. The MEE may include (or add) non-MEE metadata bits within a modified version line corresponding to ones of a plurality of data lines stored in a protected region of the off-chip memory. The non-MEE metadata bits may store coherence bits that track changes to a cache line in a remote socket, poison bits that track error containment within the data lines, and possibly other metadata bits. The MEE may further compute an eMAC using the modified version line and detect an attempt to modify one of the non-MEE metadata bits by using the eMAC within a MEE tree walk to authenticate access to the plurality of data lines. The generation of the eMAC may take place by the MEE adding the non-MEE metadata bits to version values of a version line to generate the modified version line and executing an eMAC generation algorithm over the modified version line. This eMAC generation algorithm may also make possible truncation of the eMAC such that the non-MEE metadata bits fit within the eMAC without loss of security capabilities.

Figure 1:
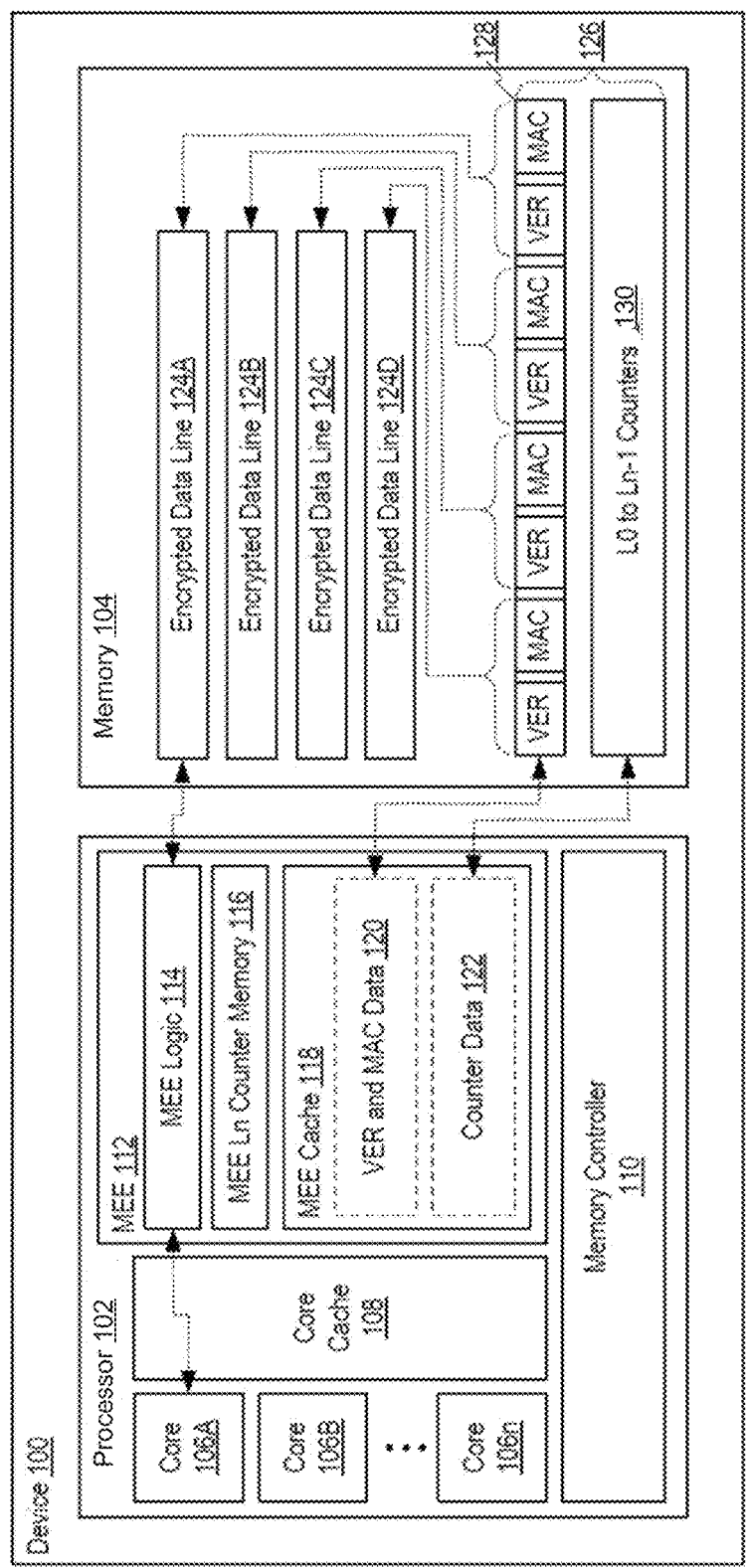
FIG. 1 illustrates an example device including cache and data organization for memory protection in accordance with at least one embodiment of the present disclosure.

FIG. 1 illustrates an example device including cache and data organization for memory protection in accordance with at least one embodiment of the present disclosure. Initially, in describing various embodiments consistent with the present disclosure reference may be made to technologies such as Software Guard Extensions (SGX) developed by the Intel® Corporation, the components that may make up SGX and the manner in which SGX may operate. SGX has been employed herein to provide a readily comprehensible perspective for understanding the various disclosed embodiments, and is not intended to limit implementations to only employing SGX. Moreover, as referenced herein "memory protection" may generally comprise protecting the confidentiality of data via encryption, integrity and/or replay protection. Integrity protection may defend against attacks wherein, for example, an attacker may modify encrypted data in memory prior to decryption. Replay protection may prevent attacks wherein, for example, an attacker replays an old version of a data line to cause the data line to be sent to a processing core after decryption, to gain unauthorized access to protected data without detection.

An example configuration for a device 100 is disclosed in FIG. 1. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Example device 100 may include a multi-core processor 102 (also referred to as processor 102 for ease of explanation) and memory 104, such as off-chip memory. In general, the processor 102 may receive data to process from the memory 104, and may return processed data to the memory 104. In at least one embodiment, the data in the memory 104 may be protected, which may be referred to as a protected region of memory.

In one example implementation, the device 100 may utilize SGX to protect at least a portion of the memory 104. SGX may provide a secure, hardware-encrypted computation and storage area within system memory, the contents of which cannot be deciphered by privileged code or even through applying hardware probes to memory bus. When the memory 104 is protected by SGX, intruders cannot read the contents of the secure area. Protected data cannot be observed outside of SGX, and thus, is inaccessible outside of SGX. In particular, the identity of programs (e.g., based on cryptographic hash measurements of each program's contents) may be signed and stored inside each program. When the programs are then loaded, the processor 102 may verify that a current measurement of the program is identical to a measurement previously embedded inside the program. The signature used to sign the embedded measurement is also verifiable because processor 102 may be provided with a public key used to verify the signature at program load time.

Malware cannot tamper with a protected program because its measurement would also be altered. Malware also cannot spoof the signature because the signing key is secure with the program's author. The features that will be described below with respect to the processor 102 and the memory 104 may be used to implement security technology like SGX in the device 100. However, consistent with the present disclosure, other security technologies existing now or developed in the future may also be used.

As illustrated in FIG. 1, the processor 102 may comprise, for example, at least one processing core 106 (e.g., core 106A, core 106B . . . core 106, collectively, "cores 106A . . . n"), a core cache 108, a memory controller 110 and a memory encryption engine (MEE) 112. Cores 106A . . . n may perform various data processing operations that may utilize data stored in core cache 108. As referenced herein, a "cache" may comprise local volatile memory to hold data that may be utilized during a data processing operation. In at least one embodiment, the core cache 108 may include a plurality of separate memory areas organized in levels with the outmost level (e.g., from which data may be transmitted to, and received from, MEE logic 114) being the last level cache (LLC). The core cache 108 may help to speed up data processing by avoiding having to repeatedly retrieve data that may be used more than once during a data processing operation from memory 104. The memory controller 110 may control how processor 102 may access memory 104, including reading data from the memory 104 and writing data to the memory 104.

The MEE 112 may include, for example, MEE logic 114 to perform memory protection operations, MEE line ("Ln") counter memory 116 to hold top-level counter data and MEE cache 118 to hold security metadata 126 at least during memory protection operations. In general, security metadata 126 may comprise data utilized in support of memory protection operations. Consistent with the present disclosure, core 106A may perform data processing operations requiring data secured by a protection system such as SGX. Protected data such as encrypted data line 124A, encrypted data line 124B, encrypted data line 124C and encrypted data line 124D (collectively, "encrypted data lines 124A . . . D") in the memory 104 may be retrieved by MEE logic 114 and decrypted prior to being provided to the core 106A (or another core). FIG. 1 shows only four encrypted data lines 124A . . . D corresponding to VER and MAC data in a single data line 128; however, the actual number of encrypted data lines 124A . . . D in memory 104 may depend on a variety of factors such as, for example, the size of the MEE-protected region in memory 104. In at least one example implementation, each data line may comprise 64 B (bytes) of data that may be stored in a protected region of memory 104 including 128 MB. Likewise, data generated by the core 106A that may be sensitive, confidential, and the like may be provided to the MEE logic 114 for encryption prior to storage in the memory 104. In this manner, an attacker monitoring data being exchanged between the processor 102 and the memory 104 may be prevented from determining the content of certain data that may be sensitive or confidential.

In at least one embodiment, MEE logic 114 may employ counter-mode encryption to decrypt encrypted data (e.g., encrypted data lines 124A . . . D) required by cores 106A . . . n, or to encrypt plaintext data generated by cores 106A . . . n, using security metadata 126 stored at least partially in memory 104. Counter-mode encryption operates by performing an exclusive OR (XOR) between the data to be encrypted or decrypted and a "cryptopad" generated based on a seed. For example:

$$\text{Cryptopad}=\text{AES}_k(\text{Seed}) \quad (1)$$

$$\text{Cipher Text}=\text{Plaintext XOR Cryptopad} \quad (2)$$

where AES is an encryption operation based on the Advanced Encryption Standard and k indicates a key size specifying the number of repetitions of transformation rounds that convert the seed into the cryptopad. The protection offered by counter-mode encryption relies mostly on the uniqueness of the seed. This allows data-related operations to proceed independently of cryptographic operations related to the seed, which may improve the overall memory protection performance in that these operations may occur in parallel. Counter-mode encryption requires that the seed be unique spatially and temporally. Spatial uniqueness may be derived from the address of the data (e.g., encrypted data line 124A) as a component of the seed. Temporal uniqueness may be achieved by associating counters with each data line, the counters being incremented when the data line is stored. The value of the counters when a data line (e.g., the encrypted data line 124A) is written to the memory 104 may be deemed a version (VER), wherein the value of the counters may be usable to verify the integrity of the VER data when the encrypted data line 124A is loaded from the memory 104 into processor 102. The MAC and VER data line 128, L0 to Ln−1 counters 130, and coherency and poison bits (FIG. 6) are generally referenced herein as security metadata 126. During encryption and decryption operations, MEE logic 114 may cause at least a portion of the security metadata 126 to be loaded into MEE cache 118 for use in encryption or decryption in conjunction with MEE LN counter memory 116. The use of the security metadata 126 and MEE Ln counter memory 116 will be described in more detail.

Figure 2A:
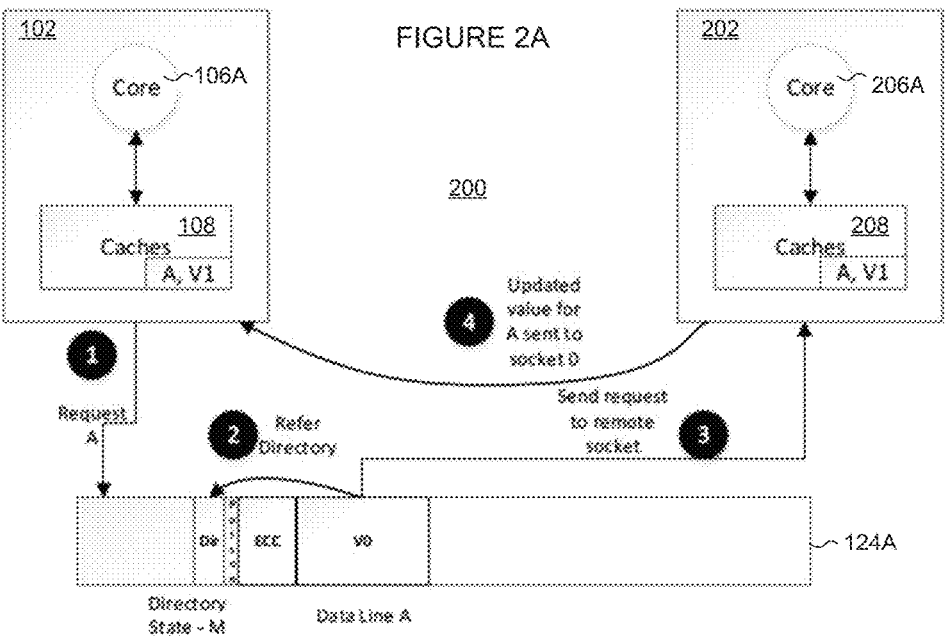
FIG. 2A illustrates a block diagram of an example multi-socket server processor properly using directory information to keep data lines coherent, and thus retrieving an updated data line from a remote socket.

FIG. 2A illustrates a block diagram of an example multi-socket server processor 200 properly using directory information to keep data lines coherent, and thus retrieving an updated data line from a remote socket. In one embodiment, SGX may operate to secure the access of confidential or secret data being read from or written to cache memory. The multi-socket server processor 200 may include two or more processors 102 and 202, respectively including a core 106A and 206A, which may access data within respective core caches 108 and 208 according to directory states stored within memory, one per data line (124A . . . 124n from FIG. 1). In order to ensure that the data accessed is up to date, the cores 106A and 206A rely on proper coherency across the core caches 108 and 208.

With further reference to FIG. 2A, the processor 102 requests data A from a data line A stored in memory (1). The entry for the current value (V0) may refer to the directory where the processor 102 learns that the data line A carries an "M" for modified state (2). Accordingly, the data in the data line A is stale, and a request is sent to a remote socket, e.g., the processor 202 for the updated data line A (3). The remote socket may then send the updated value for data line A (e.g., V1) to the requesting socket, or the processor 102 in this case (4). This completes proper access of updated data from a remote socket in the multi-socket server processor 200.

SGX is designed to protect third-party secrets from both hardware and software attacks. SGX protects the confidentiality of enclave secrets by ensuring that the enclave secrets are stored encrypted when resident in platform memory. An enclave is a protected memory structure created within virtual address space for an application, which may include code and data for the operating system and application codes that may write data into and read data out of the enclave. In order to provide complete protection from hardware attacks, SGX provides integrity protection and replay protection as well. In the absence of such protections, an attacker with physical access to the system (such as a server) can record snapshots of enclave cache lines and replay the cache lines at a later point in time. In order to achieve these protections, SGX employs MEE, which provides cryptographic mechanisms for encryption, integrity and reply protection.

In order to maintain the security guarantees for SGX, protection of application data alone may not be sufficient. Metadata such as directory state and poison information needs to be protected as well for the multi-socket server processor 200. The directory represents a state of the data cache line in remote sockets used to keep the line coherent. The directory entry indicating modified ("M") for a data line implies that the data line is cached in a modified state remotely and has the most updated data, e.g., the memory has stale data. If an attacker can modify the exclusive or modified (E/M) information in the directory, the attacker can cause silent data corruption. Note that the directory can have the E/M information stored as a coherency bit or in an encoded form where one particular encoding indicates that the line is in E/M state on the remote socket.

Figure 2B:
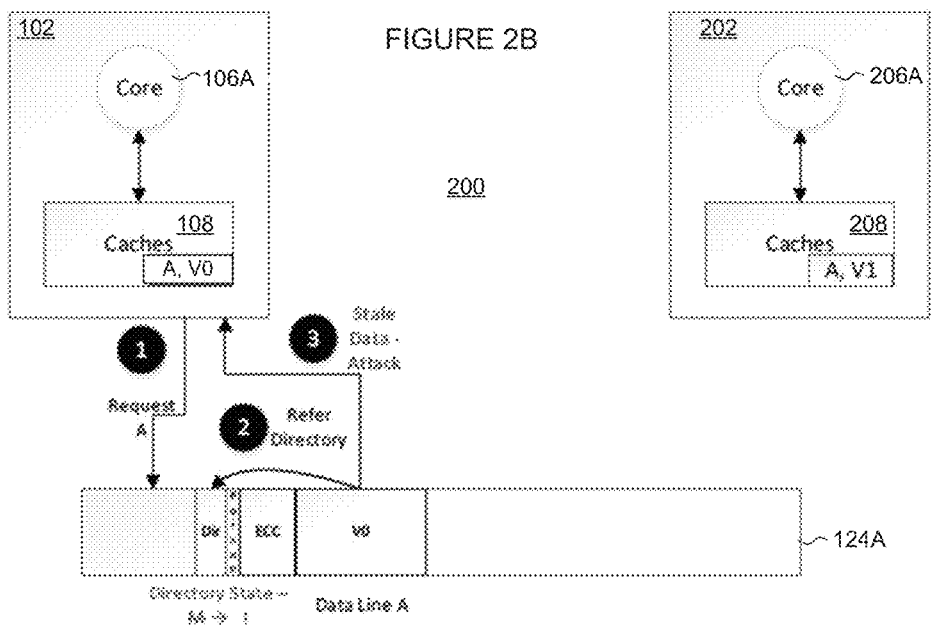
FIG. 2B illustrates the block diagram of FIG. 2A, but when an attacker changes a modified bit to invalid, causes consequent read to the data line will read stale data without detection.

Consider a data line A with an initial data value, V0, modified in a remote socket to data value V1. The directory entry corresponding to this data line has a modified ("M") bit set. If an attacker can modify the modified bit to invalid, as shown in FIG. 2B, the subsequent read to the data line A reads the stale value, V0, from home memory local to the processor 102, thereby resulting in the enclave consuming stale data without detection (3). This situation means that the multi-socket server processor 200 fails to provide integrity and replay protection.

Similarly, poison is used on server platforms for error containment. A data line failing error-correcting code (ECC) due to an error or attack is propagated back to the core 106A with the poison bit set to indicate that the data returning is corrupted so appropriate action can be taken to prevent the core 106A from consuming corrupted data. For SGX-protected memory, an attacker that can flip the poison bit constitutes an attack as corrupted data may then be consumed by the core 106A without detection. Hence, in order to maintain the security guarantees of SGX on servers (or on any machine using remote sockets and needing coherency across shared caches), metadata information reflecting the E/M state of a cache line and the poison state (a total of two bits) needs to also be protected. In order to fully explain how the coherency and poison bits may be protected, a further explanation of tree walks by the MEE 112 is first provided with reference to FIGS. 3 and 4.

Figure 3:
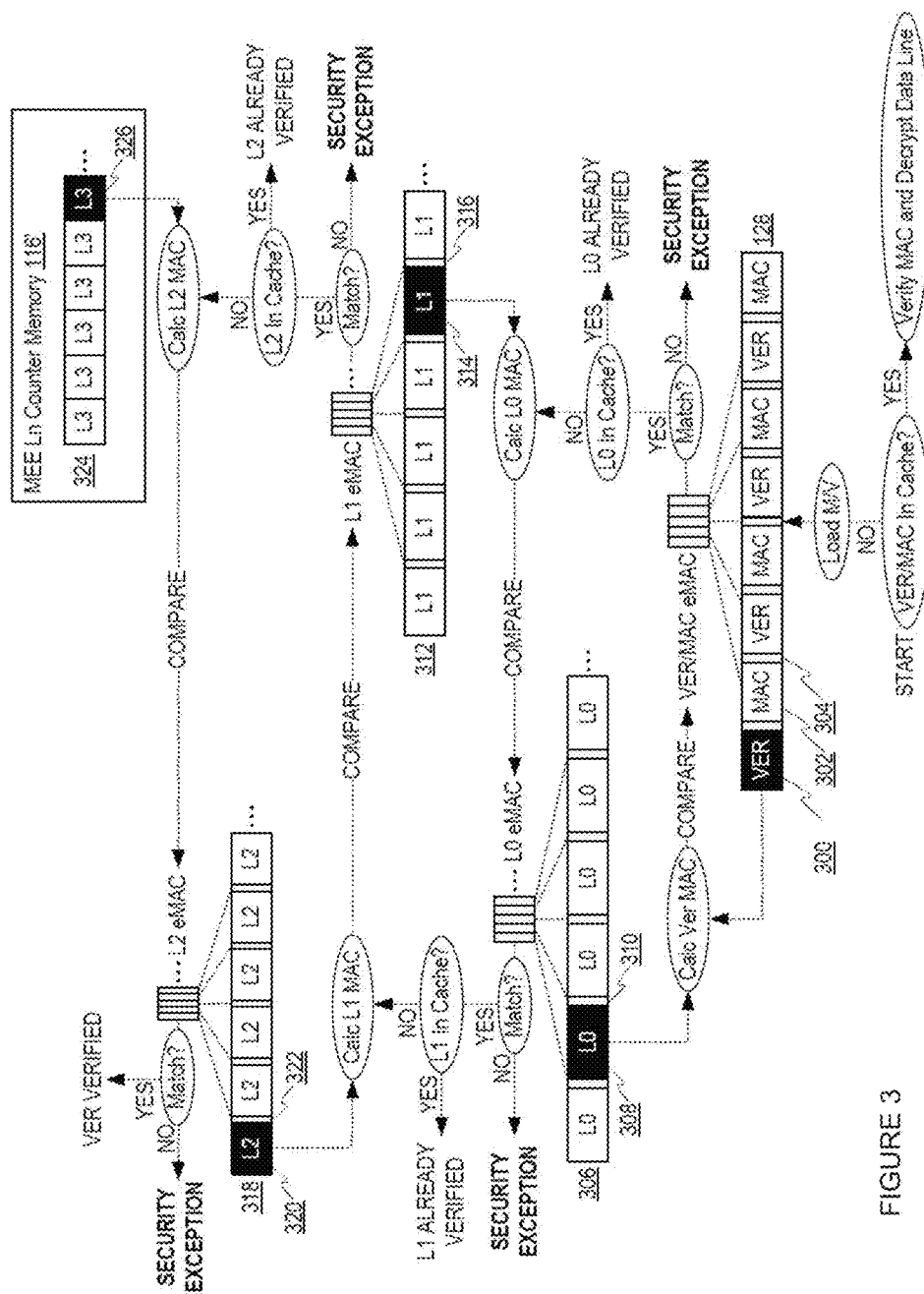
FIG. 3 illustrates a block diagram of a memory encryption engine (MEE) tree walk associated with reading data in accordance with at least one embodiment of the present disclosure.

FIG. 3 illustrates a block diagram of a memory encryption engine (MEE) tree walk associated with reading data. Given an example where the device 100 utilizes SGX, MEE logic 114 may include at least two cryptographic protection mechanisms: encryption to defend against passive attacks and integrity/replay protection to defend against active attacks. Memory encryption is designed to defend against a class of hardware attacks where an attacker attempts to silently observe data lines as they move in and out of processor 102. To defend against these attacks, MEE logic 114 may employ encryption to protect memory 104 (e.g., an MEE-specific region in memory 104). Before a data line moves to memory 104, it may be encrypted by MEE logic 114 (e.g., on-chip). For reads from memory 104, encrypted data lines 124A . . . D may be decrypted by MEE logic 114 prior to being delivered to the cores 106A . . . n.

Integrity and replay protection may involve defending against active attacks to data lines in memory 104. An active attack may involve changing data stored in memory 104 to elicit activity in the device 100 that would otherwise not have happened. A counter tree organization as illustrated in FIG. 3 may be employed to protect the integrity and ensure replay protection of encrypted data lines 124A . . . D in memory 104. An example counter tree may include VER and MAC data line 128, metadata nodes L0 labeled 304, L1 labeled 312 and L2 labeled 318, and top-level (e.g., L3) counters 324. Note that the term node may be ascribed to individual pieces or segments of metadata, such as MAC and VER values, embedded MAC (eMAC) values, or a group or a line of such values. Accordingly, different metadata values may be variably referred to as nodes herein in order to describe the tree walk authentication, as will be discussed. The MAC 302 may be associated with the encrypted data line 124D. When the encrypted data line 124D is written back to memory 104, MAC 302 may be updated to reflect a measurement of the contents of the encrypted data line 124D currently being stored in memory. When the encrypted data line 124D is later read from memory, the MEE logic 114 may verify that the contents of the encrypted data line 124D have not been edited since last loaded based on MAC 302. Authentication utilizing the MAC 302 protects against modification attacks on the encrypted data line 124D while in memory 104, and thus, helps to ensure data integrity.

A VER 300 is a counter value-based "version" of encrypted data line 124D determined when encrypted data line 124D was last stored in the memory 104. The VER 300 may be incremented each time the encrypted data line 124D is written back to memory. Metadata nodes L0 labeled 306, L1 labeled 312 and L2 labeled 318 may include both counters and an embedded MAC (eMAC) computed based on the values of the counters. For example, highlighted counters 308, 314 and 320 may correspond to the encrypted data line 124D. Moreover, while the eMAC has been illustrated in FIG. 3 as being stored as segments situated between the counters in L0 306, L1 312 and L2 318, this implementation is an example of how the eMAC may be stored. eMACs may be formulated using a counter from the next higher level in the tree as an input. This may continue all the way up to root or top-level L3 counters 324, which may be stored securely in the processor 102 (e.g., in an on-chip SRAM). L3 counters 324 may never be evicted from processor 102, and thus may be protected against attacks.

Accordingly, the counter in each node L3 labeled 324, L2 labeled 318, L1 labeled 312 and L0 labeled 306 may act as a version for a following level ending with VER/MAC node 128 storing VER 300 corresponding to the encrypted data lines 124A . . . D. Hence, when the encrypted data line 124D is written, all of the counters corresponding to the encrypted data line 124D (including L3 counter 326 and VER 300) are updated. The eMACs in each node are also updated since eMACs are computed using the values of the counters in the node. To ensure replay-protection, when loaded from the memory 104, the encrypted data line 124D may be authenticated based on the MAC 302, which is formulated utilizing the VER 300. The VER 300 may be authenticated based on counters in nodes L0 304, L1 310 and L2 316 up to L3 counter 322. Any mismatch may indicate a potential attack and may raise a security exception, thereby defeating the attack.

Loading nodes L0 306, L1 312 and/or L2 318 into MEE cache 118 for authenticating the VER 300 corresponding to the encrypted data line 124D may be deemed a "tree walk." An example tree walk is disclosed in FIG. 3. The "START" in FIG. 3 indicates that the tree walk may begin with the MEE cache 118 being checked to determine if the VER 300 is already present. The existence of any node (e.g., VER/MAC data line 128, L0 304, L1 310 or L2 316) in the MEE cache 118 may indicate that the node has already been authenticated (e.g., in a prior tree walk for the encrypted data line 124C, corresponding to another encrypted data line 124A . . . C, and the like) and that the tree walk may stop. When the VER 300 is determined to exist in the MEE cache 118, then the MAC 302 may be verified using the VER 300, and when the MAC 302 is authenticated, the decryption of the encrypted data line 124D may proceed. When the VER 300 is not determined to be present in the MEE cache 118, then the tree walk may continue.

When the VER 300 is not found to already exist in the MEE cache 118, then the VER/MAC data line 128 may be authenticated. Authentication may include calculating a MAC over the VER/MAC data line 128 and comparing the newly calculated MAC to the VER/MAC eMAC 304. For clarification, the MAC 302 resides in the VER/MAC data line 128 but protects the encrypted data line 124D, while the VER/MAC ("V/M") eMAC 304 protects the VER/MAC data line 128. Calculating a MAC for the VER/MAC data line 128 may involve a cryptographic process where, for example, an encrypted value may be generated based on the address of the encrypted data line 128, the counter value of the next higher node (e.g., counter 308 in L0 node 306) and an AES key, and the MAC value may then be generated by hashing the cryptographic value with the counter values in the data line (e.g., in the VER/MAC data line 128). The VER/MAC data line 128 may be deemed authentic when the newly calculated MAC for the VER/MAC data line 128 is determined to match the V/M eMAC 304. When the newly calculated MAC does not match the V/M eMAC 304, then a security exception may occur. As referenced herein, a security exception may include any security-related operation that may intervene to prevent the security of the device 100 from being compromised including, for example, halting MEE encryption and/or decryption operations for the data line (e.g., the encrypted data line 124D), restricting access to a protected memory space in the memory 104, notifying other systems in device 100, and the like operations.

A determination may then be made as to whether L0 304 was already loaded in the MEE cache 118 when L0 counter value 308 was used to calculate the MAC for the VER/MAC data line 128. When L0 was already in the cache, then L0 may be considered verified (e.g., authentic) and the tree walk may stop. Otherwise, the authenticity of L0 306 may need to be checked. Verifying L0 306 may involve calculating the MAC of L0 306 utilizing counter value 314 from L1 312. When the newly calculated counter value matches L0 eMAC 310, then L0 may be deemed authentic. Otherwise, when the newly computed MAC does not match L0 eMAC 310, then a security exception may occur. Similar to L0 306, a determination may be made as to whether L1 312 was already in MEE cache 118 when L1 counter 314 was used. When L1 was already in cache then L1 may be deemed authentic and the tree walk may stop. Otherwise, a new MAC may be calculated for L1 312 utilizing counter value 320 in L2 318, and the new MAC may be compared to L1 eMAC 316. When the new MAC matches L1 eMAC 316, then L1 may be deemed authentic. When the new MAC does not match L1 eMAC 316, then a security exception may be triggered. Similar to the previous two nodes, a determination may then be made as to whether L2 318 was already in MME cache 118. When L2 318 was not already in cache, then a MAC for L2 318 may be calculated using counter value 326 in L3 324. When the newly calculated MAC matches L2 eMAC 322, then the tree walk may be complete and the VER 300 may be deemed verified. When the newly calculated MAC is determined not to match L2 eMAC 322, then a security exception may be triggered.

Figure 4:
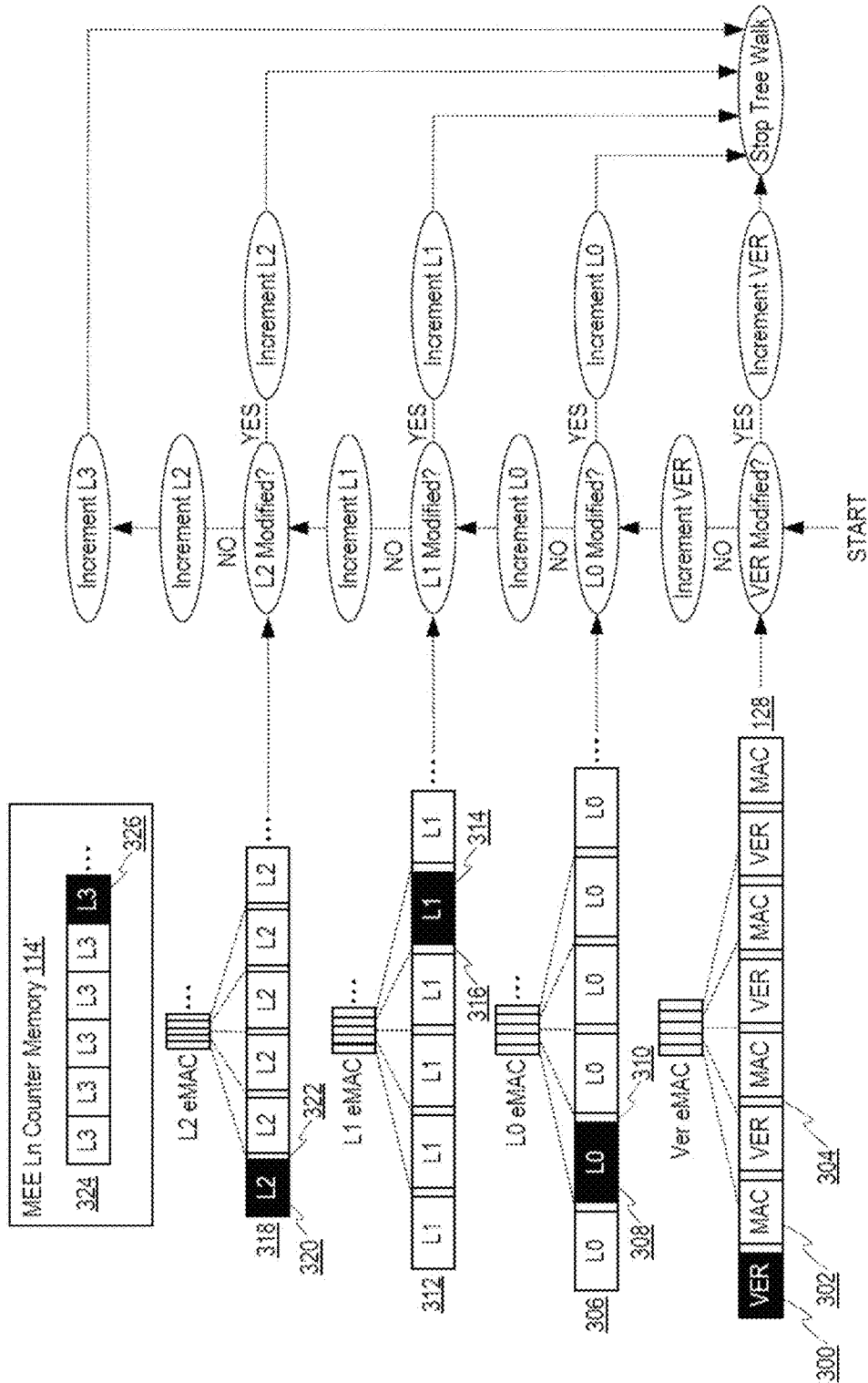
FIG. 4 illustrates an example of a MEE tree walk associated with writing data in accordance with at least one embodiment of the present disclosure.

FIG. 4 illustrates an example of a MEE tree walk associated with writing data. In an instance where data is being encrypted and stored in the memory 104 (e.g., as the encrypted data line 124D), each node in the replay tree is incremented (e.g., all of the counters in the node are incremented). However, in the MEE cache 118, there may be an optimization where the tree walk can stop without climbing to L3 324 and without having to increment all of the associated replay tree levels. With the read flow, the walk can stop just by determining that a tree level already exists in the MEE cache 118. For a write, however, the tree walk may stop only if a node is found in a "modified" state in the cache. In at least one embodiment, in the MEE cache 118, each node L2 labeled as 318, L1 labeled as 312 and L0 labeled as 306 may maintain a bit to indicate whether it was written to by a previous request. The bit being set may indicate that the copy of the node L2 318, L1 312 or L0 306 in MEE cache 118 has been modified (e.g., by another encryption request). Finding a cached node in modified state indicates that a previous write already updated the higher level nodes in the tree, and hence that the walk does not need to continue to higher levels to increment nodes. When modified nodes are evicted out of the MEE cache 118, the eMAC is re-computed to reflect the latest data being written back to the memory 104. Each eMAC computation uses a counter value in the next higher level and computes the eMAC over the contents of the node corresponding to the eMAC.

The requirement to account for modified nodes in the MEE cache 118 means that all of the nodes L2 318, L1 312 or L0 306 are traversed until a determination is made that a node has been modified. As shown in FIG. 4, each node from L0 306 to L3 324 may be traversed looking for a version in the MEE cache 118 that has been modified. When a node is not located in the MEE cache 118 during the tree walk, the node may be loaded into the MEE cache 118 from memory 104. In each level of traversal, the node is incremented. If, however, a node is determined to be modified, the tree walk stops after the modified node is incremented. When no modified nodes are found in the MEE cache 118, the tree walk may stop after incrementing counter 326 in L3 324. When it is time to encrypt the data line and write it to memory 104 (e.g., as encrypted data line 124D), the eMACs 322, 316, 310 and 304 may then be recalculated. The VER 300 may be utilized to recalculate the MAC 304, which may be utilized to encrypt the data as the encrypted data line 124D. The encrypted data line 124D may then be stored in the memory 104.

There are two metadata bits that need to be protected to ensure that an SGX application does not consume corrupted data (poisoned data) and to prevent silent dropping of updated data through modification of directory state. The present disclosure proposes protecting these bits to ensure that these bits cannot be modified without detection by including these bits in integrity calculation. The proposed mechanisms involve minimal changes to the current MEE design and afford the protection of these metadata bits naturally. In addition, with the proposed invention, metadata update becomes a part of the MEE write flow and does not require a separate read from memory.

Figure 5:
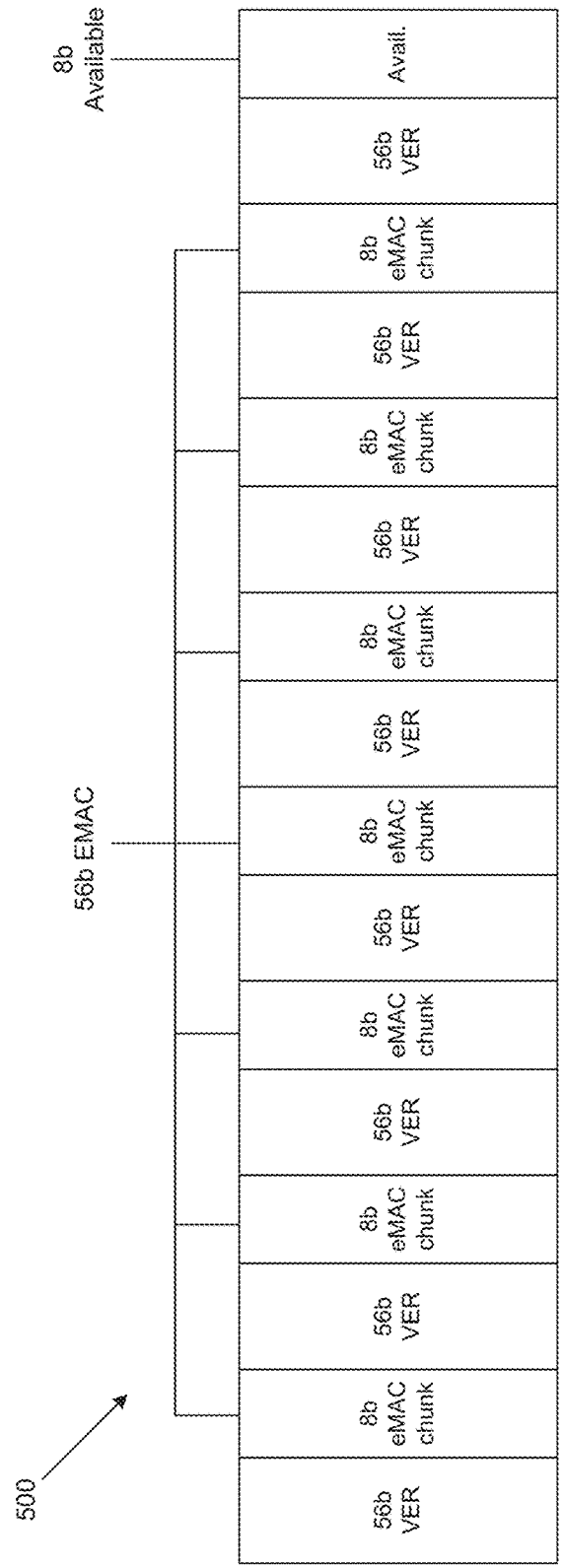
FIG. 5 illustrates counter (or version) line organization of MEE metadata according to one embodiment of the present disclosure.

FIG. 5 illustrates counter (or version) line organization 500 of MEE metadata according to one embodiment of the present disclosure. In each version line (VER, L0-L2), the current organization packs eight (8) counters (56 bits each) and the MAC computed over the counters is also 56 bits long. This results in 8 bits of available space in each version line which is unused in the current design. The first counter level, the version level, stores the per-line counter information by storing a version for each of the data lines it covers. A version line stores versions for eight (8) data lines in the protected memory region. The version value stored in the version line is used to generate the cryptographic seed needed for counter mode encryption.

The embedded MAC (eMAC) in the version line is computed over the version values of the 8 data lines covered and uses the counter from the next level (e.g., L0) for the eMAC computation. Since the version line has MEE metadata information on a data line granularity, the MEE 112 may store the non-MEE metadata (coherence and poison) in the version line as well. However, the version line has only 8 bits of available space and the MEE 112 needs two (2) bits of non-MEE metadata per data line, requiring 16 bits of storage. Accordingly, the eMAC may be shrunk to 48 bits from the current 56 bits. Note that the eMAC generation algorithm executed by the MEE 112 may allow the eMAC to be truncated to up to 40 bits without any loss of security. Hence, by reducing the eMAC to 48 bits, the MEE 112 can get 16 bits of space needed for the non-MEE metadata storage.

Note that MACs are designed to cause no collisions, e.g., given a data line and a corresponding MAC, the probability of finding another line that will have the same MAC is extremely small. Now, the smaller size of MAC can actually increase chances of collision. However, the MEE 112 resets the device 100 if a security violation (MAC mismatch) is detected. Hence, an attacker trying to forge a MAC always has to do a new attempt after failure. Retaining this behavior on MAC mismatch, designers have cryptographically shown that cutting the MAC size to 40 bits (and even 32 bits) does not increase the probability of collisions.

Figure 6:
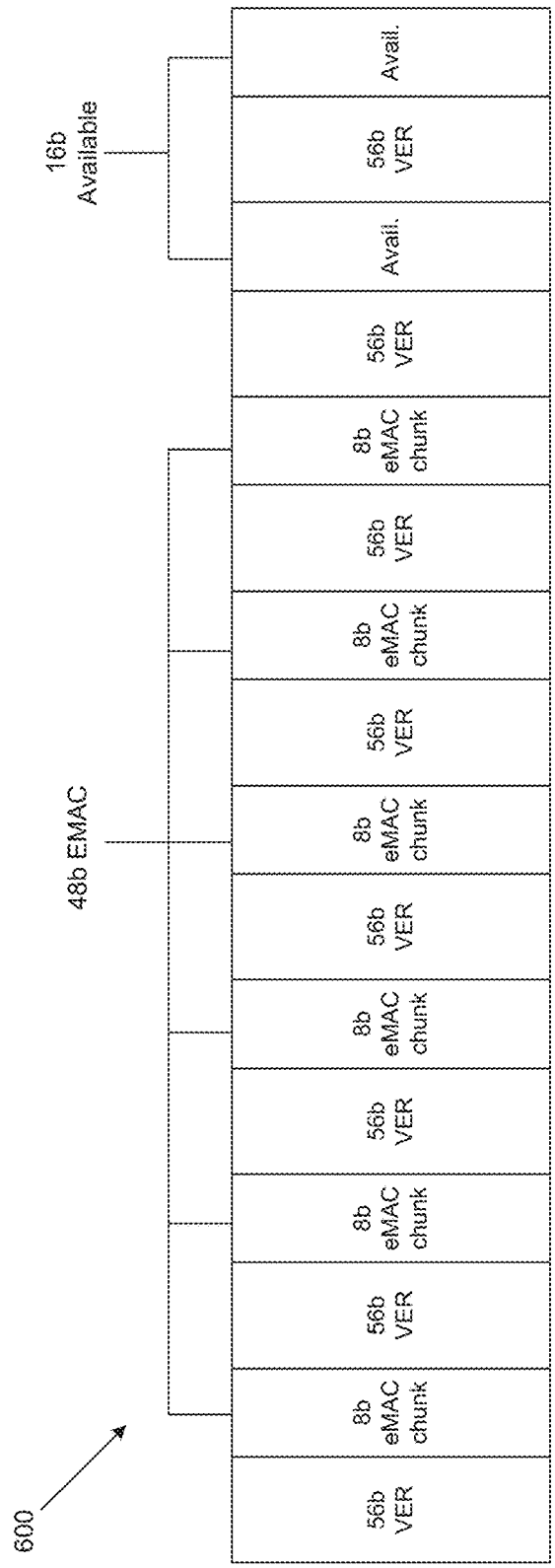
FIG. 6 illustrates version line organization of MEE metadata according to another embodiment of the present disclosure.

FIG. 6 illustrates the proposed version line organization 600 of MEE metadata that provides for storing the non-MEE metadata: the coherence and poison bits. In order to protect the integrity of the non-MEE metadata bits, the MEE 112 may include these bits as part of the eMAC computation on the version line. In the current MEE design, the version values associated with a data line are used to compute the embedded MAC (eMAC). In one embodiment, the version values along with the 16 bits of non-MEE metadata may be used as the input to the eMAC generation algorithm, as follows:

eMAC_VER=eMAC(VERSION_VALUES
(8×56 b),NON-MEE METADATA(8×2 b)).

With the proposed eMAC construction, the non-MEE metadata bits are protected by the embedded MAC (eMAC) from modification. Any attempt by an attacker to modify the protected non-MEE metadata bits will be detected as an eMAC failure, and thus preventing silent data dropping and consumption of incorrect data as discussed before.

Figure 7:
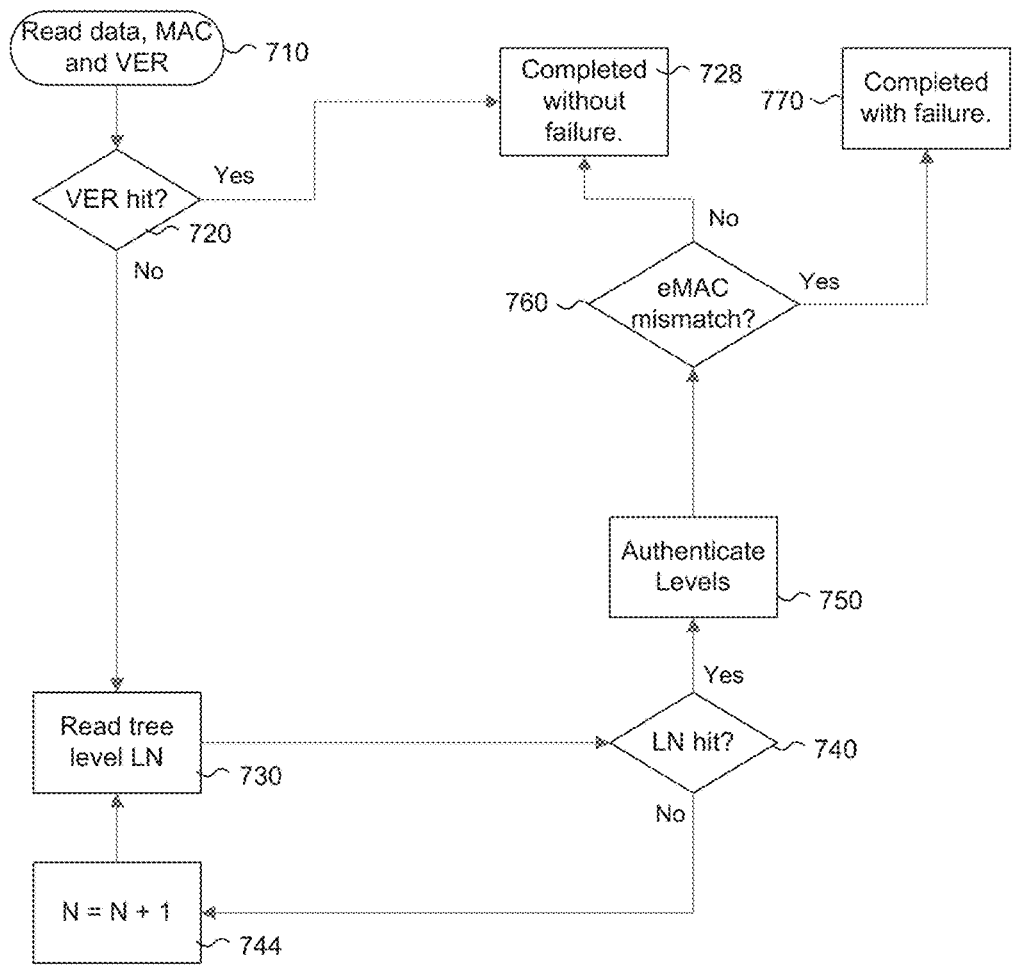
FIG. 7 illustrates a flow chart of a current MEE tree walk.

FIG. 7 illustrates a flow chart of a current MEE tree walk. As discussed before, in the tree walk, the MEE 112 may load the replay protection tree nodes along the tree branch of the data line until a node along the branch hits in the MEE cache 118 and verifies all the nodes loaded from memory by verifying their associated embedded MACs.

More specifically, the MEE 112 may read data from any encrypted data line 124A through 124D in memory 104 and read the MAC and VER values from the accompanying VER/MAC metadata line 128 (710). The MEE 112 may determine whether the VER value is a hit with the VER value in the MEE cache 118 (720). When the tree walk hits at the version level, the tree walk ends, completed without a failure (728). In this scenario, no verification of the tree nodes is needed as no nodes are needed to be fetched from memory in this case. Hence, a tree walk hitting at the version level terminates with a success unconditionally. The verification of the data line is still carried out outside of the tree walk as the data line could itself be modified by an attacker which will only be detected by a double MAC (DMAC) verification.

Accordingly, FIG. 7 continues when a there is no VER hit with the VER value in the MEE cache 118. The MEE 112 may read the tree level line (LN) (730), and determine whether there is a LN hit (740). If not, the node level is increased by one to continue looking for a LN hit (744), as the walk proceeds up through version lines. When a LN hit is received, the MEE 112 may authenticate the level of the version line at the node where the hit is obtained (750). As part of the authentication, the MEE 112 determines whether the eMAC is a mismatch (760). When the eMAC is a mismatch, the MEE tree walk completes with a failure (770). When the eMAC matches, however, the MEE tree walk completes without a failure (728), having authenticated the data read from off-chip memory.

Figure 8:
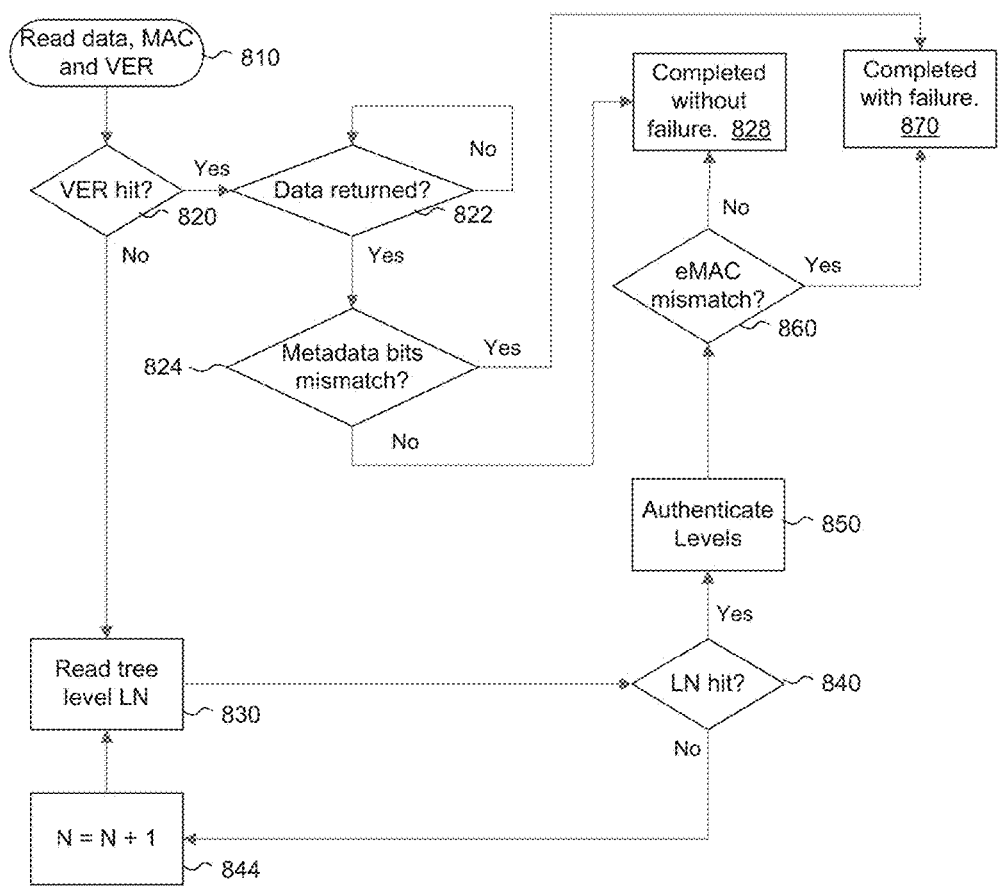
FIG. 8 illustrates a flow chart of a proposed MEE tree walk that protects and accounts for non-MEE metadata bits according to at least one embodiment of the present disclosure.

FIG. 8 illustrates a flow chart of a proposed MEE tree walk that protects against attacks and accounts for non-MEE metadata bits such as the coherence and poison bits discussed herein. In the proposed tree walk, the MEE 112 issues requests for the data itself (if the request received is a read) and for the associated version node. More specifically, the MEE 112 may read data from any encrypted data line 124A through 124D in memory 104 and read the MAC and VER values from the accompanying VER/MAC metadata line 128 (810). The MEE 112 may determine whether the VER value is a hit with the VER value in the MEE cache 118 (820).

In the case of a version miss, the tree walk continues to fetch the tree nodes until a node is found in MEE cache 118 or requests for all nodes along the tree branch up to L3 have been issued (830, 840 and 844). In the case of a version miss, the version line fetched from memory is authenticated by verifying the embedded MAC (850). The proposed tree walk continues with determining whether the eMAC is a mismatch (860). When the eMAC is a mismatch, the MEE tree walk completes with a failure (870). When the eMAC matches, however, the MEE tree walk completes without a failure (828), having authenticated the data read from off-chip memory.

As proposed herein, the embedded MAC (eMAC) verification may also ensure that the non-MEE metadata bits were not modified in memory as the eMAC is now computed over the version values and the non-MEE metadata. Hence, integrity of non-MEE metadata (such as the coherence and poison bits) is naturally verified as part of the read flow with the proposed eMAC construction for the version lines.

In case of a version line hit (820), the MEE tree walk ends at the version level and no eMAC verification is performed. In the current MEE design, when a tree node is cached, its eMAC is stripped and not stored in the cache. Instead, the next level counter value is stored in the cache line to help eMAC re-computation on eviction from the MEE cache 118. Hence, in the case of a version hit, the version line in the MEE cache 118 carries the correct value of the non-MEE metadata. On a read return from memory, the non-MEE metadata bits returned with the read data (822) are compared with the non-MEE metadata bits stored in the MEE caches for a match (824). A mismatch is flagged as an integrity failure (870), thereby guaranteeing that an attacker cannot modify non-MEE metadata without detection.

On a write, the MEE does the tree walk as described above. However, the current write can update the poison bit associated with the write data. Hence, on a write flow, the MEE, in addition to doing the tree walk, also updates the non-MEE metadata bits in the version line. When the version line is evicted, the updated non-MEE metadata bits naturally get protected as the eMAC generated over the version line also covers the non-MEE metadata.

Figure 9:
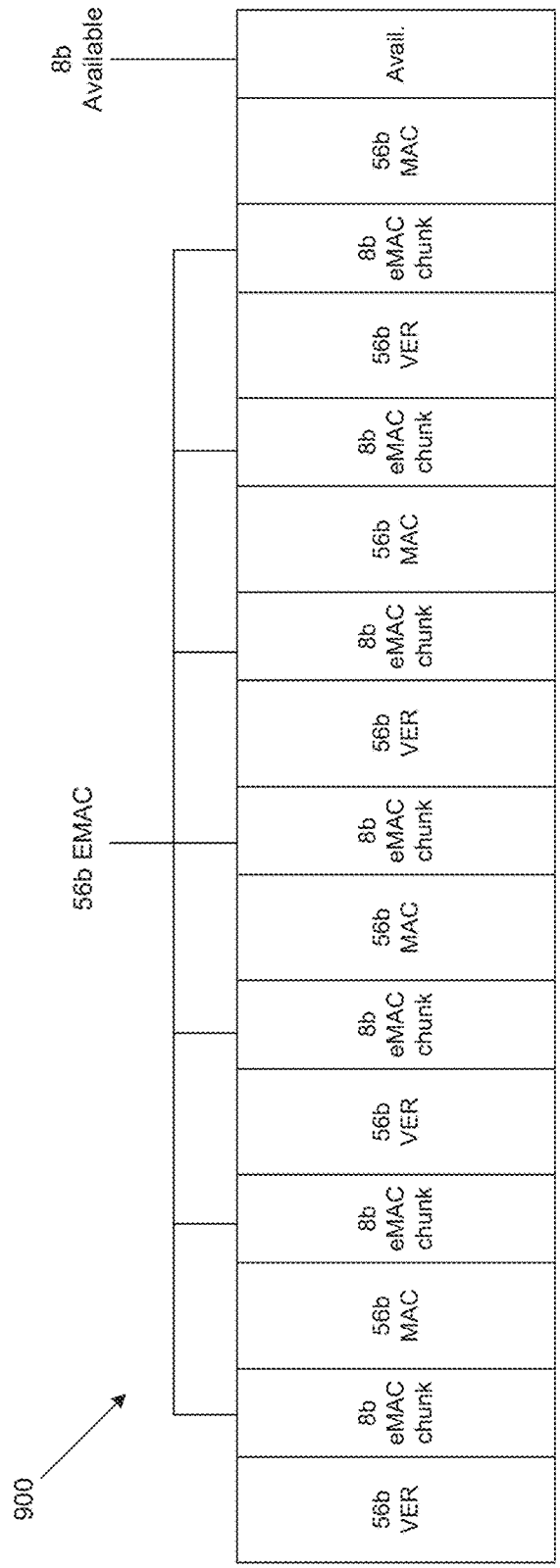
FIG. 9 illustrates non-MEE metadata storage with the MAC and VER on the same line.

FIG. 9 illustrates non-MEE metadata storage 900 with the MAC and VER on the same cache line in the MEE cache 118, e.g., in order to be able to fetch them together in one memory access. This helps in reducing the overall bandwidth addition due to MEE as in the lack of spatial locality, a majority of accesses end up fetching both MAC and VER lines separately, resulting in two additional accesses for fetching MAC and VER values. Placing MAC and VER on same cache line allows both to be fetched with one additional access instead of two additional accesses. The present disclosure can be extended in a straightforward way for this metadata organization. FIG. 9 shows the updated metadata organization along with the non-MEE metadata bits. With this organization, there are four (4) MACs and four (4) VERs on one cache line and the eMAC does not need to be truncated as the MEE may store non-MEE metadata for four (4) lines, requiring eight (8) bits which are available in a version line.

Additional non-MEE metadata bits may also be protected by extending the presently proposed design to accommodate additional bits. As discussed before, the eMAC size can be reduced to 40 bits without compromising security. Hence, an additional eight (8) bits can be freed up for storing non-MEE metadata. In addition to truncating the eMAC, the DMAC can also be truncated without reducing security. With the organization shown in FIG. 9, 16*4=64 bits can be freed up for non-MEE metadata storage. Hence, the proposed disclosure lends itself future extension of protecting additional metadata bits.

Figure 10:
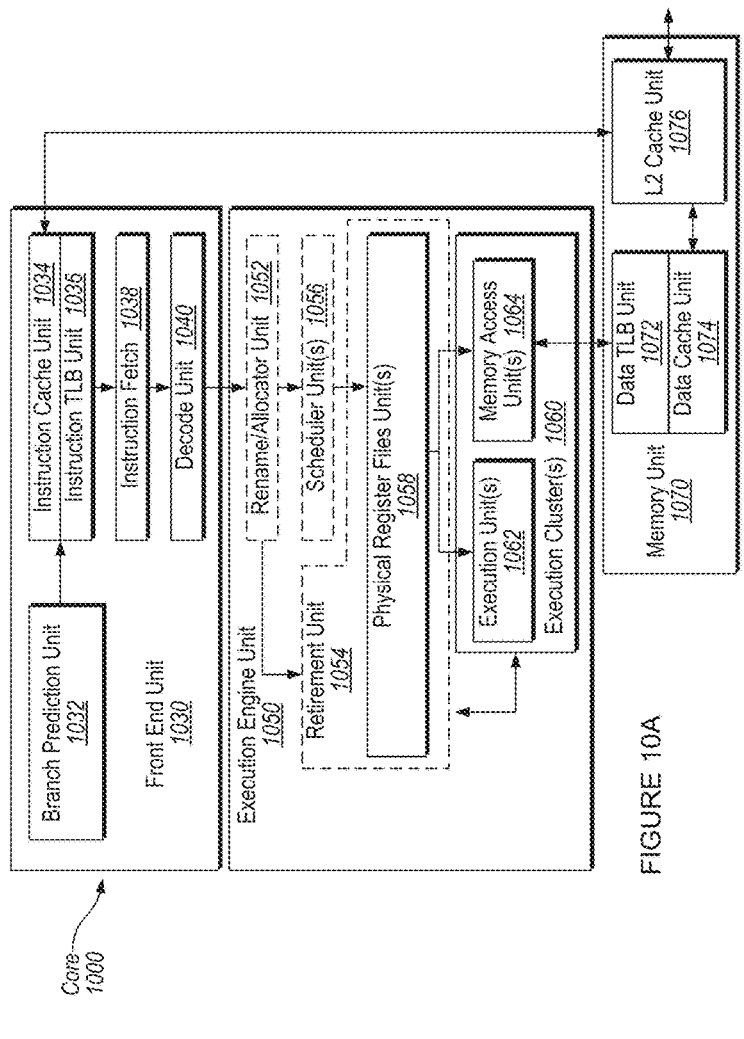
FIG. 10A is a block diagram illustrating a micro-architecture for a processor such as a processing device and/or memory execution unit illustrated in FIG. 1 according to one embodiment.
FIG. 10B is a block diagram illustrating an in-order pipeline and a register renaming stage, out-of-order issue/execution pipeline according to one embodiment.

FIG. 10A is a block diagram illustrating a micro-architecture for a processor core 1000 that may execute, at least in part, the device 100 of FIG. 1. Specifically, processor core 1000 depicts an in-order architecture core and a register renaming logic, out-of-order issue/execution logic to be included in a processor according to at least one embodiment of the disclosure. The embodiments of the error correcting code that carry additional bits may be implemented by processor core 1000.

The processor core 1000 includes a front end unit 1030 coupled to an execution engine unit 1050, and both are coupled to a memory unit 1070. The processor core 1000 may include a reduced instruction set computing (RISC) core, a complex instruction set computing (CISC) core, a very long instruction word (VLIW) core, or a hybrid or alternative core type. As yet another option, processor core 1000 may include a special-purpose core, such as, for example, a network or communication core, compression engine, graphics core, or the like. In one embodiment, processor core 1000 may be a multi-core processor or may be part of a multi-processor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions, and generate as an output one or more micro-operations, micro-code entry points, microinstructions, other instructions, or other control signals, which are decoded from, or which otherwise reflect, or are derived from, the primary instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 may be coupled to the physical register file unit(s) 1058. Each of the physical register file unit(s) 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 may be overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 may be coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor core 1000 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 10B is a block diagram illustrating an in-order pipeline and a register renaming stage, out-of-order issue/execution pipeline implemented by processor core 1000 of FIG. 10A according to some embodiments of the disclosure. The solid lined boxes in FIG. 10B illustrate an in-order pipeline, while the dashed lined boxes illustrates a register renaming, out-of-order issue/execution pipeline. In FIG. 10B, a processor pipeline 1090 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 10B.

Figure 11:
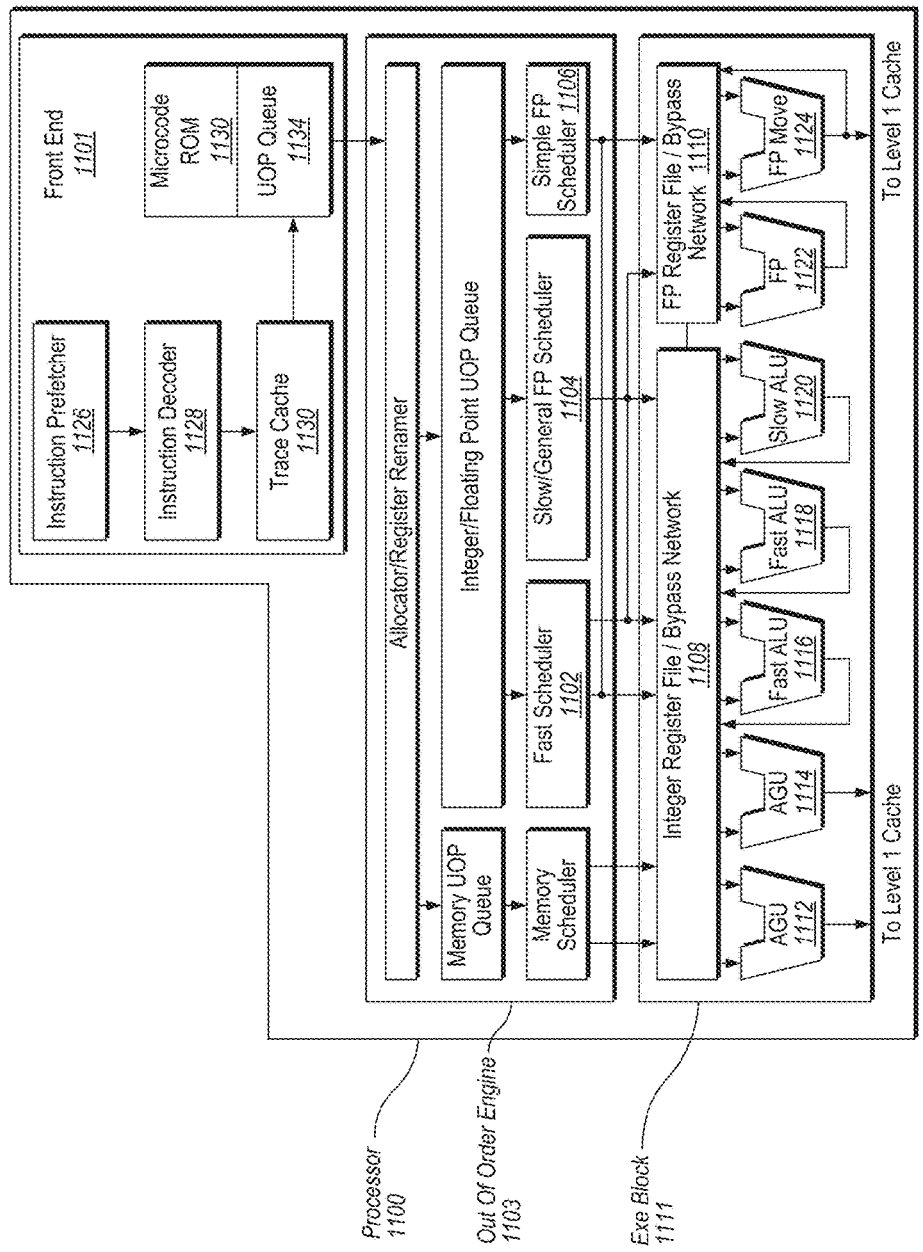
FIG. 11 illustrates a block diagram of the micro-architecture for a processor that includes logic circuits to execute a processing device and/or memory execution unit as illustrated in FIG. 1, according to one embodiment.

FIG. 11 illustrates a block diagram of the micro-architecture for a processor 1100 that includes logic circuits that may execute, at least in part, the device 100 of FIG. 1. In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments that may execute, at least in part, the device 100 of FIG. 1 may be implemented by processor 1100.

The front end 1101 may include several units. In one embodiment, the instruction prefetcher 1116 fetches instructions from memory and feeds them to an instruction decoder 1118 which in turn decodes or interprets them. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM (or RAM) 1132 may provide the uops needed to complete the operation.

Some instructions are converted into a single micro-op, whereas others need several micro-ops to complete the full operation. In one embodiment, if more than four micro-ops are needed to complete an instruction, the decoder 1118 accesses the microcode ROM 1132 to do the instruction. For one embodiment, an instruction may be decoded into a small number of micro ops for processing at the instruction decoder 1118. In another embodiment, an instruction may be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment may schedule on each half of the main clock cycle while the other schedulers may only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one embodiment also includes a bypass network that may bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1114. For one embodiment, the floating point execution blocks 1122, 1124, execute floating point, MMX, SIMD, and SSE, or other operations. The floating point ALU 1122 of one embodiment includes a 64-bit-by-64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment may execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, may be implemented to support a variety of data bits including 16, 32, 128, 256, etc. Similarly, the floating point units 1122, 1124, may be implemented to support a range of operands having bits of various widths. For one embodiment, the floating point units 1122, 1124, may operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
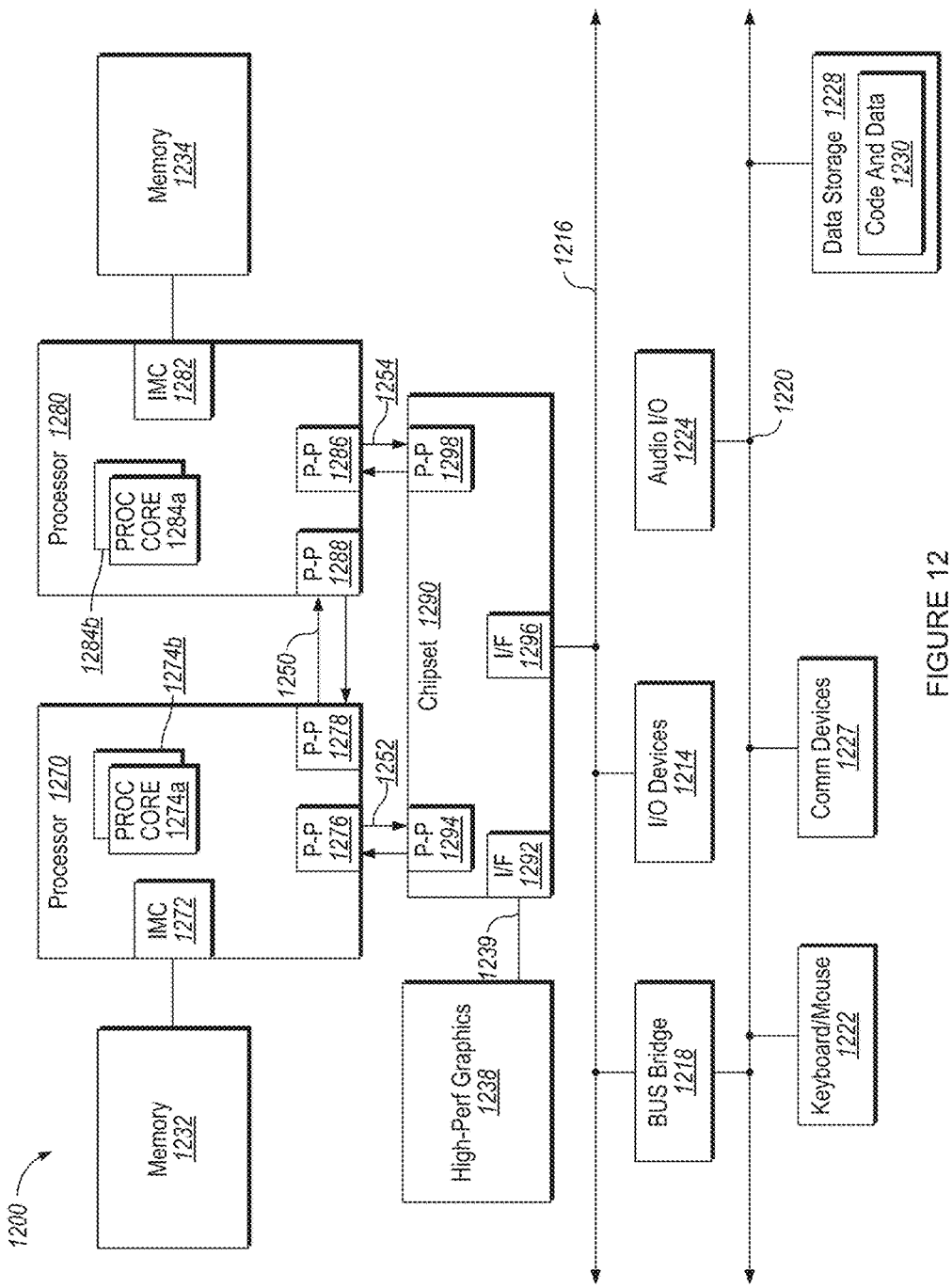
FIG. 12 is a block diagram of a computer system according to one implementation.

Embodiments may be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores (i.e., processor cores 1274a and 1274b and processor cores 1284a and 1284b), although potentially many more cores may be present in the processors. The processors each may include hybrid write mode logics in accordance with an embodiment of the present. The embodiments that may execute, at least in part, the device 100 of FIG. 1 may be implemented in the processor 1270, the processor 1280, or both.

While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to second bus 1220. Note that other architectures are possible. For example, instead of the point-to-point architecture of FIG. 11, a system may implement a multi-drop bus or other such architecture.

Figure 13:
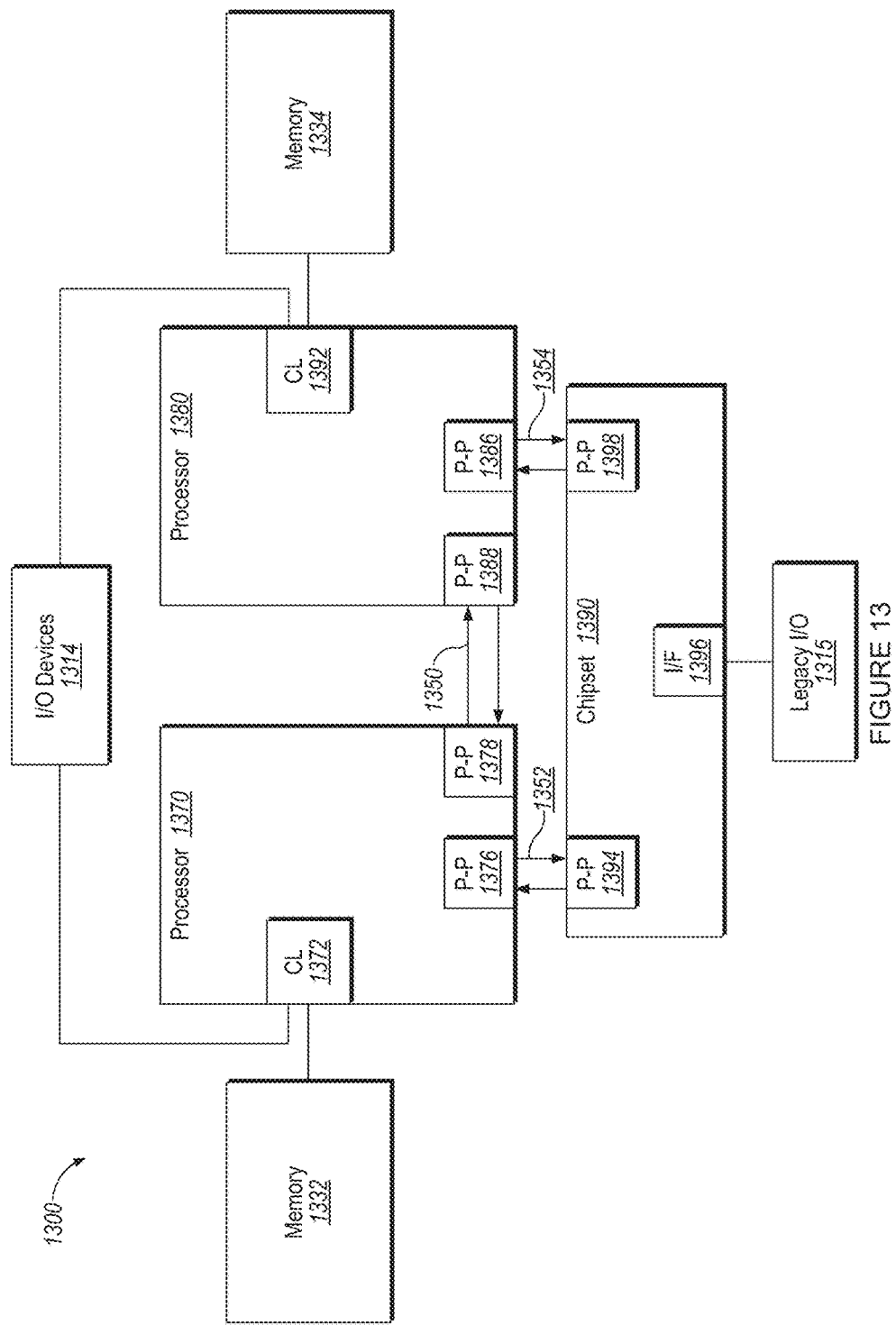
FIG. 13 is a block diagram of a computer system according to another implementation.

Referring now to FIG. 13, shown is a block diagram of a third system 1300 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 13.

FIG. 13 illustrates that the processors 1370, 1380 may include integrated memory and I/O control logic ("CL") 1372 and 1392, respectively. For at least one embodiment, the CL 1372, 1382 may include integrated memory controller units such as described herein. In addition, CL 1372, 1392 may also include I/O control logic. FIG. 13 illustrates that the memories 1332, 1334 are coupled to the CL 1372, 1392, respectively, and that I/O devices 1314 are also coupled to the control logic 1372, 1392. Legacy I/O devices 1315 are coupled to the chipset 1390. The embodiments that may execute, at least in part, the device 100 of FIG. 1 may be implemented in processor 1370, in processor 1380, or in both processors 1370 and 1380.

Figure 14:
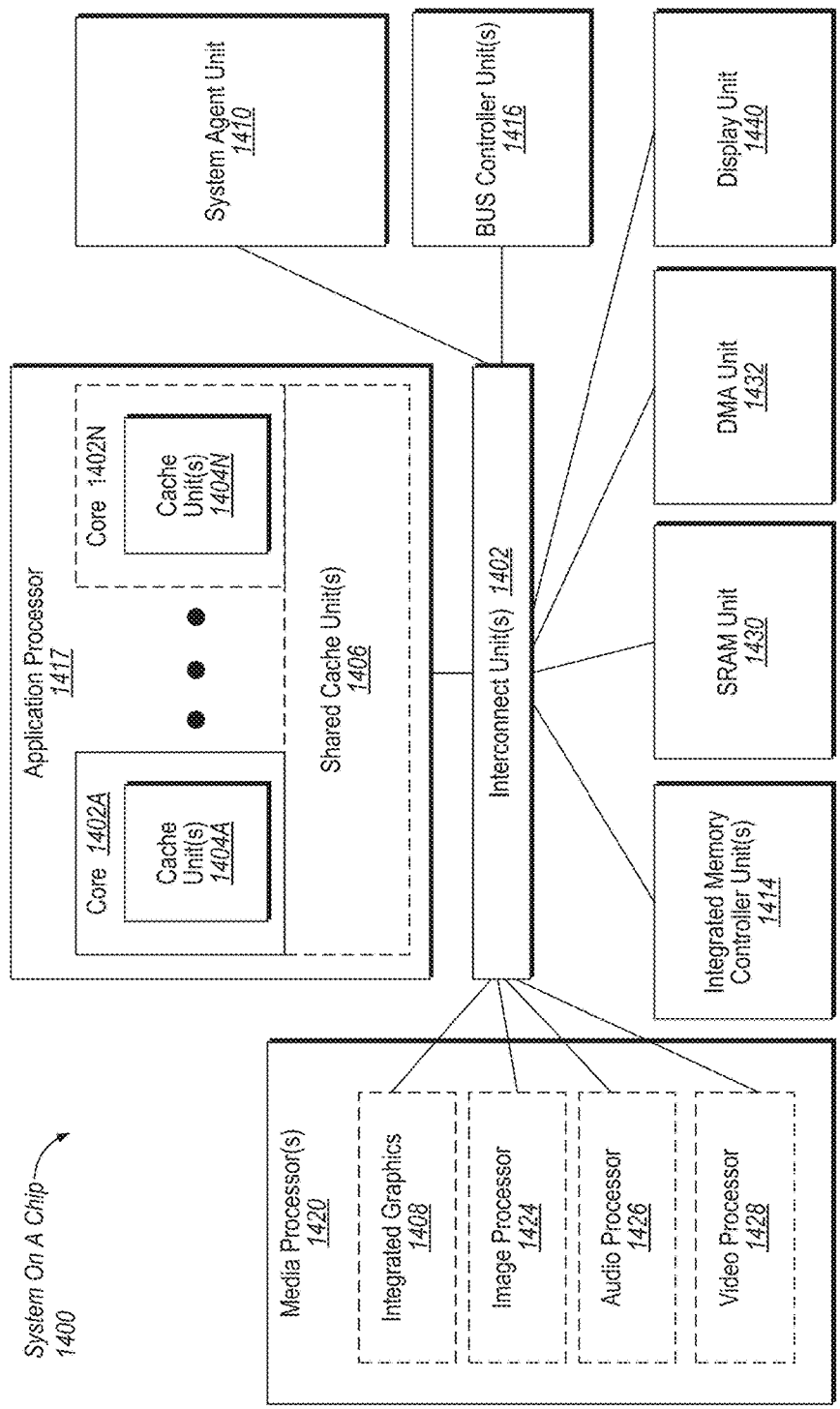
FIG. 14 is a block diagram of a system-on-a-chip according to one implementation.

FIG. 14 is an exemplary system on a chip (SoC) 1400 that may include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1400 of FIG. 14, dashed lined boxes are features on more advanced SoCs. An interconnect unit(s) 1402 may be coupled to: an application processor 1417 which includes a set of one or more cores 1402A-N and shared cache unit(s) 1406; a system agent unit 1410; a bus controller unit(s) 1416; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays.

Figure 15:
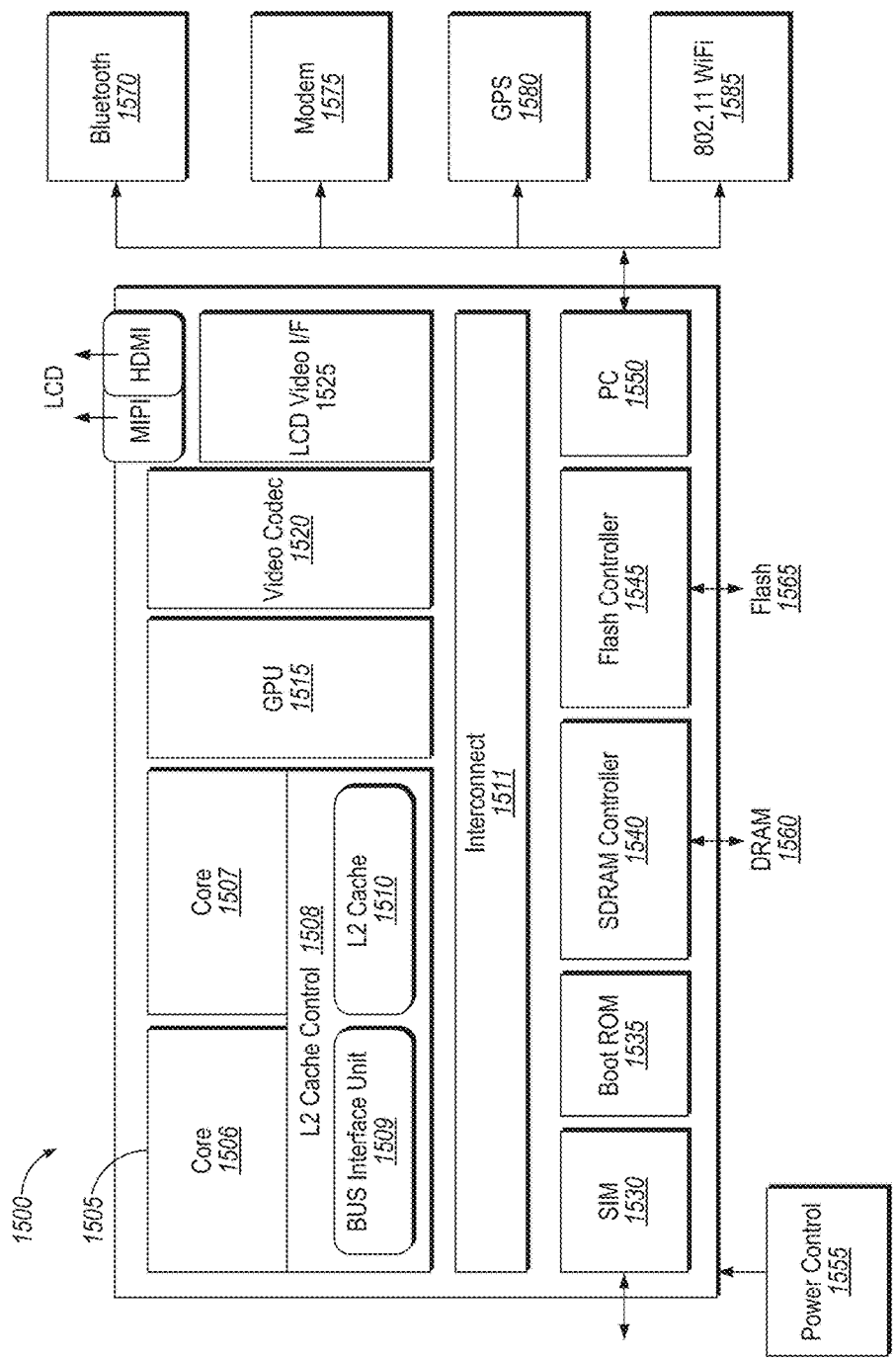
FIG. 15 illustrates another implementation of a block diagram for a computing system.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments that may execute, at least in part, the device 100 of FIG. 1 may be implemented in the SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which may implement one or more aspects of the described disclosure.

Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and Wi-Fi 1185. Note as stated above, a UE includes a radio for communication. As a result, these peripheral communication modules may not all be included. However, in a UE some form of a radio for external communication should be included.

Figure 16:
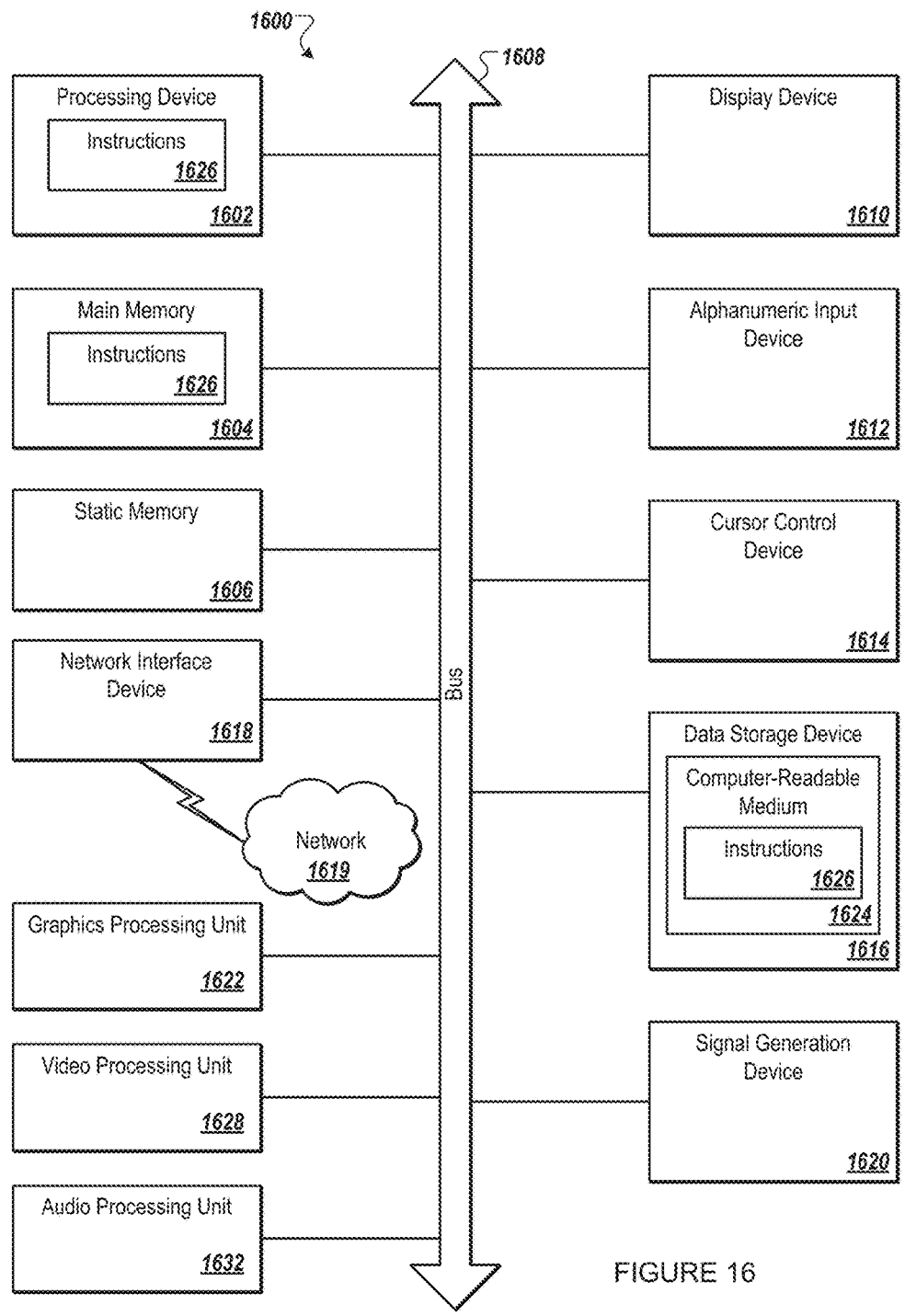
FIG. 16 illustrates another implementation of a block diagram for a computing system.

FIG. 16 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute, at least in part, the device 100 of FIG. 1 may be implemented in computing system 1600.

The computing system 1600 includes a processing device 1602, main memory 1604 (e.g., flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. In one embodiment, processing device 1602 may include one or processor cores. The processing device 1602 is configured to execute the processing logic 1626 for performing the operations discussed herein.

In one embodiment, processing device 1602 may be or make up at least a part of the device 100 of FIG. 1. Alternatively, the computing system 1600 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1618 communicably coupled to a network 1619. The computing system 1600 also may include a video display device 1610 (e.g., a liquid crystal display (LCD) or a cathode ray tube (CRT)), an alphanumeric input device 1612 (e.g., a keyboard), a cursor control device 1614 (e.g., a mouse), a signal generation device 1620 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1616 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic during execution thereof by the computing system 1600; the main memory 1604 and the processing device 1602 also constituting computer-readable storage media.

The computer-readable storage medium 1624 may also be used to store instructions 1626 utilizing the processing device 1602, such as described with respect to FIGS. 1-9, and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processing device including: 1) a processing core; 2) a memory controller, operatively coupled to the processing core, to access data in an off-chip memory; and 3) a memory encryption engine (MEE) operatively coupled to the memory controller, the MEE to: a) store a coherence bit and a poison bit of metadata within a modified version line corresponding to at least one of a plurality of data lines stored in a protected region of the off-chip memory; b) compute an embedded message authentication code (eMAC) using the modified version line; and c) detect an attempt to modify the coherence bit or the poison bit by using the eMAC to authenticate access to the at least one of the plurality of data lines.

In Example 2, the processing device of Example 1, wherein to detect the attempt to modify the coherence bit or the poison bit, the MEE is to use the eMAC within a MEE tree walk to authenticate access to the at least one of the plurality of data lines, wherein the MEE tree walk is performed to execute integrity calculations.

In Example 3, the processing device of Example 2, wherein for a version line hit within the MEE tree walk, the MEE is further to: a) compare the coherence bit and the poison bit of the at least one of the plurality of data lines in MEE cache with corresponding coherence bit and poison bit returned with read data from the off-chip memory; and b) generate an integrity failure in response to a mismatch between the coherence bit or the poison bit that is compared.

In Example 4, the processing device of Examples 1-3, wherein to compute the eMAC, the MEE is further to: a) add the coherence bit and the poison bit to version values of a version line to generate the modified version line; and b) execute an eMAC generation algorithm over the modified version line.

In Example 5, the processing device of Example 4, wherein the eMAC generation algorithm, when executed, is further to truncate the eMAC to make room for at least the coherence bit and the poison bit.

In Example 6, the processing device of Examples 1-5, wherein the MEE is further to: a) receive a write request related to at least one of the plurality of data lines; and b) update one of the coherence bit or the poison bit corresponding to the at least one of the plurality of data lines upon executing a write to the one of the plurality of data lines.

Various embodiments may have different combinations of the structural features described above. For instance, all optional features of the computing system described above may also be implemented with respect to the method or process described herein and specifics in the examples may be used anywhere in one or more embodiments.

Example 7 is a processor including: 1) a processing core; 2) a memory controller, operatively coupled to the processing core, to access data in an off-chip memory; and 3) a memory encryption engine (MEE) operatively coupled to the memory controller and the off-chip memory, the MEE to: a) store non-MEE metadata bits within a modified version line corresponding to ones of a plurality of data lines stored in a protected region of the off-chip memory; b) compute an embedded message authentication code (eMAC) using the modified version line; and c) detect an attempt to modify one of the non-MEE metadata bits by using the eMAC within a MEE tree walk to authenticate access to the plurality of data lines.

In Example 8, the processor of Example 7, wherein the non-MEE metadata bits comprise a coherence bit related to an exclusive/modified (E/M) state of a cache line corresponding to at least one of the plurality of data lines.

In Example 9, the processor of Examples 7-8, wherein the non-MEE metadata bits comprise a poison bit to track error containment on a server related to at least one of the plurality of data lines.

In Example 10, the processor of Examples 7-9, wherein to compute the eMAC, the MEE is further to: a) add the non-MEE metadata bits to version values of a version line to generate the modified version line; and b) execute an eMAC generation algorithm over the modified version line.

In Example 11, the processor of Examples 10, wherein the eMAC generation algorithm, when executed, is further to truncate the eMAC to make room for the non-MEE metadata bits.

In Example 12, the processor of Example 7, wherein for a version line hit within the MEE tree walk, the MEE is further to: a) compare the non-MEE metadata bits of respective data lines in MEE cache with corresponding non-MEE metadata bits returned with read data from the off-chip memory; and b) generate an integrity failure in response to a mismatch between the non-MEE metadata bits that are compared.

In Example 13, the processor of Examples 7-12, wherein the MEE is further to: a) receive a write request related to one of the plurality of data lines; and b) update one of the non-MEE metadata bits corresponding to one of the plurality of data lines upon executing a write to the one of the plurality of data lines.

Various embodiments may have different combinations of the structural features described above. For instance, all optional features of the processors and methods described above may also be implemented with respect to a system described herein and specifics in the examples may be used anywhere in one or more embodiments.

Example 14 is a server comprising a processing device that includes: 1) a processing core; 2) a memory controller, operatively coupled to the processing core, to access data in an off-chip memory; and 3) a memory encryption engine (MEE) operatively coupled to the memory controller and the off-chip memory, the MEE to: a) store non-MEE metadata bits within a modified version line corresponding to ones of a plurality of data lines stored in a protected region of the off-chip memory; b) compute an embedded message authentication code (eMAC) using the modified version line; and c) detect an attempt to modify one of the non-MEE metadata bits by using the eMAC within a MEE tree walk to authenticate access to the plurality of data lines.

In Example 15, the server of Example 14, wherein the non-MEE metadata bits comprise coherence bits related to an exclusive/modified (E/M) state of cache lines corresponding to the plurality of data lines.

In Example 16, the server of Examples 14-15, wherein the non-MEE metadata bits comprise poison bits to track error containment related to the plurality of data lines.

In Example 17, the server of Examples 14-16, wherein to compute the eMAC, the MEE is further to: a) add the non-MEE metadata bits to version values of a version line to generate the modified version line; and b) execute an eMAC generation algorithm over the modified version line.

In Example 18, the server of Example 17, wherein the eMAC generation algorithm, when executed, is further to truncate the eMAC to make room for the plurality of non-MEE metadata bits.

In Example 19, the server of Example 14, wherein for a version line hit within the MEE tree walk, the MEE is further to: a) compare the non-MEE metadata bits of respective data lines in MEE cache with corresponding non-MEE metadata bits returned with read data from the off-chip memory; and b) generate an integrity failure in response to a mismatch between the non-MEE metadata bits that are compared.

In Example 20, the server of Examples 14-19, wherein the MEE is further to: a) receive a write request related to one of the plurality of data lines; and b) update one of the non-MEE metadata bits corresponding to one of the plurality of data lines upon executing a write to the one of the plurality of data lines.

In Example 21, the server of Example 14, wherein the MEE is further to store MAC and version (VER) values associated with a single data line on a single cache line to be able to fetch the MAC and VER values in a single access of MEE cache.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to employing error correcting code to carry additional bits in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
    a processing core;
    a memory controller, operatively coupled to the processing core, to access data in an off-chip memory; and
    a memory encryption engine (MEE) operatively coupled to the memory controller, the MEE to:
        determine a version value of an encrypted data line that is stored in a protected region of the off-chip memory, the version value comprising a counter value that is based on a level of cache and incremented each time the encrypted data line is written back to the protected region of the off-chip memory;
        store a coherence bit and a poison bit with the version value of the encrypted data line within a modified version line, wherein the poison bit is to indicate whether data returning from the off-chip memory is corrupted due to failure in an error-correcting code (ECC) check of the encrypted data line;
        compute an embedded message authentication code (eMAC) based on a combination of the version value, the coherence bit, and the poison bit; and
        detect an attempt to modify at least one of the coherence bit or the poison bit of the modified version line through use of the eMAC to authenticate access to the encrypted data line.

2. The processing device of claim 1, wherein to detect the attempt to modify the at least one of the coherence bit or the poison bit, the MEE is to use the eMAC within a MEE tree walk to authenticate access to the encrypted data line, wherein the MEE tree walk is performed to execute integrity calculations.

3. The processing device of claim 2, wherein for a version line hit within the MEE tree walk, the MEE is further to:
    compare the coherence bit and the poison bit of the modified version line associated with the level of cache with corresponding coherence bit and poison bit returned with read data from the off-chip memory; and
    generate an integrity failure in response to a mismatch between the coherence bit or the poison bit that is compared.

4. The processing device of claim 1, wherein to compute the eMAC, the MEE is further to execute an eMAC generation algorithm over the modified version line.

5. The processing device of claim 4, wherein the eMAC generation algorithm, when executed, is further to truncate the eMAC to make room for at least the coherence bit and the poison bit.

6. The processing device of claim 1, wherein the MEE is further to:
    receive a write request related to the encrypted data line; and
    update one of the coherence bit or the poison bit corresponding to the encrypted data line upon execution of a write operation to the encrypted data line.

7. A processor comprising:
    a processing core;
    a memory controller, operatively coupled to the processing core, to access data in an off-chip memory; and
    a memory encryption engine (MEE) operatively coupled to the memory controller and the off-chip memory, the MEE to:
        determine a version value of an encrypted data line that is stored in a protected region of the off-chip memory, the version value comprising a counter value that is based on a level of cache and incremented each time the encrypted data line is written back to the protected region of the off-chip memory;
        store non-MEE metadata bits with the version value of the encrypted data line within a modified version line;
        compute an embedded message authentication code (eMAC) based on a combination of the version value and the non-MEE metadata bits; and
        detect an attempt to modify at least one of the non-MEE metadata bits of the modified version line through use of the eMAC within a MEE tree walk of the cache, to authenticate access to the encrypted data line stored in the off-chip memory.

8. The processor of claim 7, wherein the non-MEE metadata bits comprise a coherence bit related to an exclusive/modified (E/M) state of a cache line corresponding to the encrypted data line.

9. The processor of claim 7, wherein the non-MEE metadata bits comprise a poison bit to track error containment on a server related to the encrypted data line, wherein the poison bit is to indicate whether data returning from the off-chip memory is corrupted due to failure in an error-correcting code (ECC) check of the encrypted data line.

10. The processor of claim 7, wherein to compute the eMAC, the MEE is further to execute an eMAC generation algorithm over the modified version line.

11. The processor of claim 10, wherein the eMAC generation algorithm, when executed, is further to truncate the eMAC to make room for the non-MEE metadata bits.

12. The processor of claim 7, wherein in response to a version line hit within the MEE tree walk, the MEE is further to:
compare the non-MEE metadata bits of the modified version line in the level of cache with corresponding non-MEE metadata bits returned with read data from the off-chip memory; and
generate an integrity failure in response to a mismatch between the non-MEE metadata bits that are compared.

13. The processor of claim 7, wherein the MEE is further to:
receive a write request related to the encrypted data line; and
update one of the non-MEE metadata bits corresponding to the encrypted data line upon execution of a write operation to the encrypted data line.

14. A server comprising a processing device that includes:
a processing core;
a memory controller, operatively coupled to the processing core, to access data in an off-chip memory; and
a memory encryption engine (MEE) operatively coupled to the memory controller and the off-chip memory, the MEE to:
determine a version value of an encrypted data line that is stored in a protected region of the off-chip memory, the version value comprising a counter value that is based on a level of cache and incremented each time the encrypted data line is written back to the protected region of the off-chip memory;
store non-MEE metadata bits with the version value of the encrypted data line within a modified version line;
compute an embedded message authentication code (eMAC) using the modified version line based on a combination of the version value and the non-MEE metadata bits; and
detect an attempt to modify at least one of the non-MEE metadata bits by using the eMAC within a MEE tree walk of the cache, to authenticate access to the encrypted data line stored in the off-chip memory.

15. The server of claim 14, wherein the non-MEE metadata bits comprise coherence bits related to an exclusive/modified (E/M) state of cache lines corresponding to encrypted data line.

16. The server of claim 14, wherein the non-MEE metadata bits comprise poison bits to track error containment related to the encrypted data line, wherein the poison bits are to indicate whether data returning from the off-chip memory is corrupted due to failure in an error-correcting code (ECC) check of the encrypted data line.

17. The server of claim 14, wherein to compute the eMAC, the MEE is further to execute an eMAC generation algorithm over the modified version line.

18. The server of claim 17, wherein the eMAC generation algorithm, when executed, is further to truncate the eMAC to make room for the non-MEE metadata bits.

19. The server of claim 14, wherein in response to a version line hit within the MEE tree walk, the MEE is further to:
compare the non-MEE metadata bits of the modified version line with corresponding non-MEE metadata bits returned with read data from the off-chip memory; and
generate an integrity failure in response to a mismatch between the non-MEE metadata bits that are compared.

20. The server of claim 14, wherein the MEE is further to:
receive a write request related to the encrypted data line; and
update one of the non-MEE metadata bits corresponding to the encrypted data line upon execution of a write operation to the encrypted data line.

21. The server of claim 14, wherein the MEE is further to store MAC and version (VER) values associated with the encrypted data line on a single cache line to be able to fetch the MAC and VER values in a single access of the level of cache.

* * * * *